United States Patent
Greer et al.

(10) Patent No.: US 12,455,478 B2
(45) Date of Patent: Oct. 28, 2025

(54) AUTOMATIC SMART GLASS MAPPING

(71) Applicant: SAGE Electrochromics, Inc., Faribault, MN (US)

(72) Inventors: Bryan D. Greer, Northfield, MN (US); Ahoo Malekafzali Ardakan, Cottonwood Heights, UT (US)

(73) Assignee: SAGE Electrochromics, Inc., Faribault, MN (US)

( * ) Notice: Subject to any disclaimer, the term of this patent is extended or adjusted under 35 U.S.C. 154(b) by 111 days.

(21) Appl. No.: 18/307,745

(22) Filed: Apr. 26, 2023

(65) Prior Publication Data

US 2023/0418117 A1    Dec. 28, 2023

Related U.S. Application Data

(60) Provisional application No. 63/363,913, filed on Apr. 29, 2022.

(51) Int. Cl.
| | |
|---|---|
| G02F 1/1343 | (2006.01) |
| G02F 1/155 | (2006.01) |
| G02F 1/163 | (2006.01) |
| H01Q 1/12 | (2006.01) |
| H04B 1/401 | (2015.01) |
| H04B 17/318 | (2015.01) |

(52) U.S. Cl.
CPC ........ *G02F 1/134363* (2013.01); *G02F 1/155* (2013.01); *G02F 1/163* (2013.01); *H01Q 1/1271* (2013.01); *H04B 1/401* (2013.01); *H04B 17/318* (2015.01)

(58) Field of Classification Search
CPC .... G02F 1/134363; G02F 1/155; G02F 1/163; G02F 1/13306; G02F 2201/58; H01Q 1/1271; H04B 1/401; H04B 17/318; E06B 2009/2464; E06B 9/24

See application file for complete search history.

(56) References Cited

U.S. PATENT DOCUMENTS

| | | | |
|---|---|---|---|
| 10,935,864 B2 | 3/2021 | Shrivastava et al. | |
| 10,989,976 B2 | 4/2021 | Shrivastava et al. | |
| 11,137,659 B2 | 10/2021 | Shrivastava et al. | |
| 2011/0046810 A1 | 2/2011 | Bechtel | |
| 2019/0294018 A1* | 9/2019 | Shrivastava | G02F 1/163 |
| 2020/0117067 A1* | 4/2020 | Wang | G02F 1/163 |
| 2020/0259237 A1* | 8/2020 | Shrivastava | H01Q 1/2291 |
| 2020/0301234 A1 | 9/2020 | McNeil | |
| 2021/0376445 A1* | 12/2021 | Shrivastava | H01Q 5/25 |

OTHER PUBLICATIONS

International Search Report and Written Opinion mailed Aug. 11, 2023 in PCT/US2023/020392, Sage Electrochromics, Inc., pp. 1-13.

* cited by examiner

*Primary Examiner* — Charles S Chang
(74) *Attorney, Agent, or Firm* — Robert C. Kowert; Kowert, Hood, Munyon, Rankin & Goetzel, P.C.

(57) ABSTRACT

A computing system for mapping one or more panes on a structure is provided. The computing system may receive a first indication from a first pane. The first indication may be associated with a first identification (ID) unique to the first pane. The computing system may receive a second indication from a second pane. The computing system may determine a relative position of the first pane relative to a position of the second pane based on receiving the first indication and the second indication. The computing system may map the relative position of the first pane to the first ID.

20 Claims, 15 Drawing Sheets

AUTOMATIC SMART GLASS MAPPING

BACKGROUND

This application claims benefit of priority to U.S. Provisional Application Ser. No. 63/363,913, entitled "AUTOMATIC SMART GLASS MAPPING," filed Apr. 29, 2022, and which is hereby incorporated herein by reference in its entirety.

Electrically switchable glass may include a type of glass or glazing for which light transmission properties of the glass or glazing are altered when electrical power (e.g., voltage/current) is applied to the electrically switchable glass. For example, electrically-switchable glass may include suspended particles that are organized or that revert to a disorganized state based on the application of electrical power. Also, electrically-switchable glass may include electrochromic materials that change in opacity when electrical power is applied. Some electrochromic materials may maintain a level of opacity resulting from the application of an electrical voltage, even after the electrical voltage is no longer applied. Also, electrically-switchable glass may include polymer dispersed liquid crystals that may be ordered in an aligned configuration or a non-aligned configuration which causes light to be allowed or impeded from passing through the electrically switchable glass, wherein the alignment of the liquid crystals is controlled by applying electrical power to the material.

Controllers may control electrically switchable glass by controlling a voltage or current applied to the electrically switchable glass. In many systems different types and sizes of electrically-switchable glass may be used, and the different types and sizes of electrically switchable glass may require different levels of current and/or voltage to achieve similar levels of opacity. Thus, in systems comprising various sizes and types of electrically-switchable glass, configuration and control parameters for respective controllers that control different pieces of electrically switchable glass may need to account for differences in characteristics of the electrically switchable glass (e.g., different required voltage levels or currents) to achieve particular opacity levels. However, when setting up control for smart glass panes, complications may arise concerning identifying the respective physical locations of the smart glass panes in order to set up control.

Figure 1A:
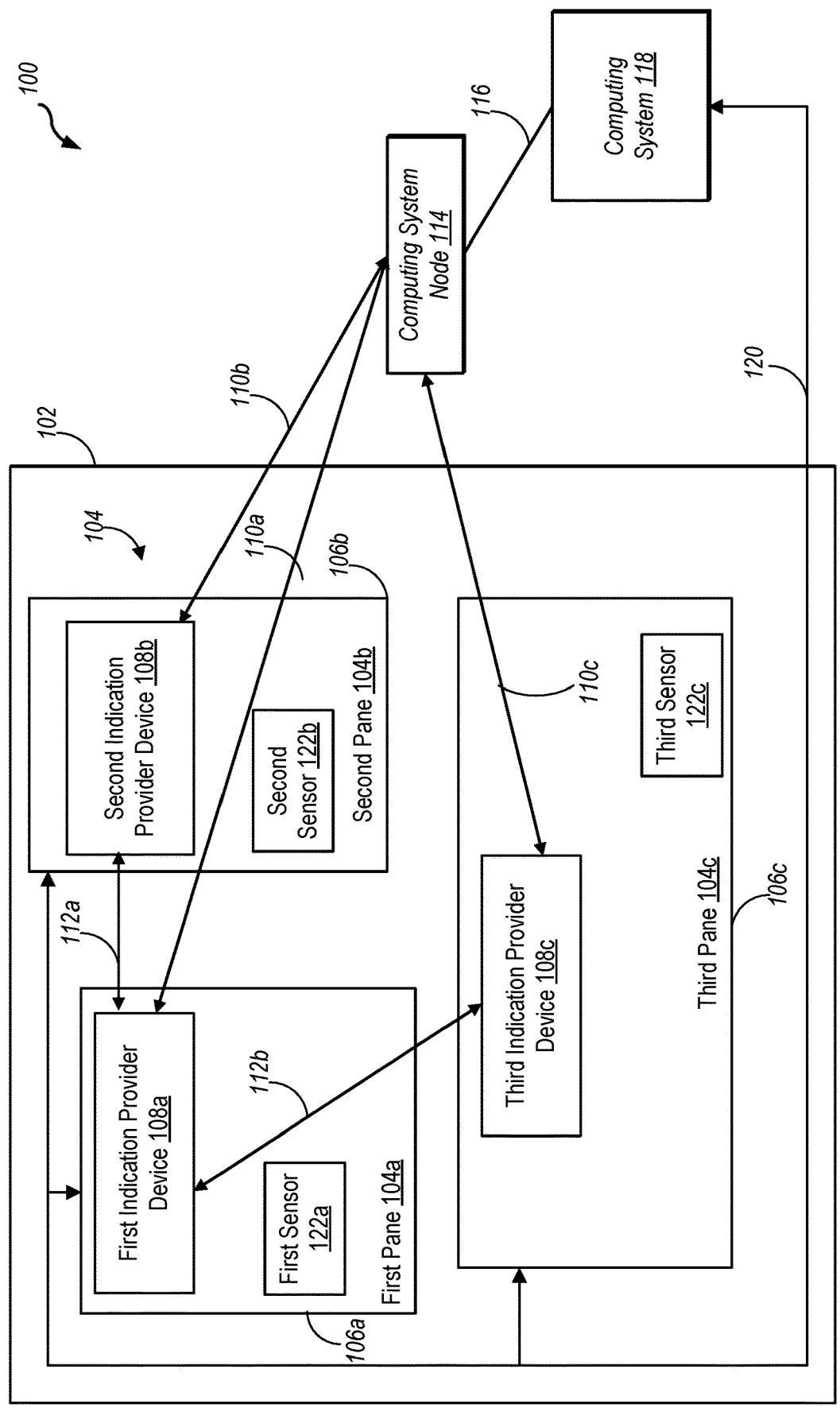
FIG. 1A illustrates an example system for mapping one or more panes according to some aspects.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

When setting up control for electrochromic glass panes, for example to modulate tint of the electrochromic glass panes, it may be helpful to know and/or determine the physical location or position of each of the electrochromic glass panes in relation to each other in order to set up control. For example, a physical location or position of each of the electrochromic glass panes may be coordinated with an installation diagram. Several of the electrochromic glass panes may have a same or similar size and/or shape in a façade or skylight of which each electrochromic glass pane may be interchangeably installed and/or positioned. In some cases, each of the electrochromic glass panes may be installed according to a predefined wiring schedule or diagram. However, during installation of the wiring, some of the wiring may be installed incorrectly so that the actual wiring connected to a pane position is not in accordance with the wiring schedule or diagram. Such errors may require that wiring be uninstalled and/or reinstalled to correct the errors. Additionally, or alternatively, such errors may be corrected by adjusting a system to redefine an identification associated with a pane position. Regardless of whether installation errors exist, tint and clear procedures to verify correct electrochromic glass pane installation in respective pane locations may be tedious and time consuming. Further, wireless electrochromic glass panes may create additional cost, man-power, and time issues as no wiring and, thus, no wiring schedules or diagrams may be used to coordinate electrochromic glass panes with specific installation positions.

Various embodiments of systems and associated databases for electrochromic glass systems are described herein. In some embodiments, a system, for example at an end user site having electrochromic glass panes, includes one or more computing devices configured to determine a relative position of an electrochromic glass pane relative to a position of one or more other electrochromic glass panes and map the relative position of the electrochromic glass pane to an identification (ID) unique to the electrochromic glass pane. For example, the one or more computing devices may receive a first indication from a first electrochromic glass pane. The first indication may be associated with a first ID unique to the first electrochromic glass pane. The one or more computing device may also receive a second indication from a second electrochromic glass pane. Based on receiving the first indication and the second indication, the one or more computing systems may determine a relative position of the first electrochromic glass pane relative to a position of the second electrochromic glass pane. Subsequently, the one or more computing systems may map the relative position of the first pane to the first ID.

In some aspects, the systems described herein may utilize wireless power transfer techniques to provide accurate information about orientation and/or distance of electrochromic glass pane receivers with respect to a transmitter. For example, a location of each pane served by a node (e.g., a transmitter) may be accurately mapped in relation to one or more other panes. In some aspects, if there is overlap and multiple nodes (e.g., multiple transmitters) can wirelessly reach some of the receivers, a more extensive pane orientation map may be constructed. Additionally, or alternatively, a location of the node may be mapped (e.g., using a global positioning system (GPS), manually recording the location of the transmitter) to determine the location of each pane. Wireless power transfer techniques may provide accurate information about orientation and/or distance information using radio frequency (RF) with phased-array antennas or directionally focused light or infrared (e.g., a split-cavity laser).

In some aspects, each pane of the system and/or in communication with the system may have a wireless communication node (e.g., a transceiver). Transmission from any one pane to another pane may provide a signal strength (e.g., received signal strength indicator (RSSI)) measurable by the receiver of the signal. Measurement of the signal strength may be used to determine a distance between panes in order to determine a relative distance between panes. For example, by measuring a complete map of interactions (e.g., signal strengths) between pairs of panes, the relative positions of each of the panes may be determined. For instance, a signal may be transmitted from each pane. Each of the panes receiving the transmitted signals may measure a signal strength of each respective received signal. Each of the panes may share the signal strengths of each of the signals from the other panes for assembling a matrix and creating a map of the panes. In some aspects, additional information including top, bottom, left, and right directional information may be included or provided to determine an actual position of each of the panes after a relative position of each of the panes is determined.

In some aspects, each pane of the system and/or in communication with the system may have a wireless communication node (e.g., transceiver) for performing ultrawide band (UWB) communications between panes. UWB communications may be able to measure distances from point to point (e.g., pane to pane) with accuracy of about 2 or 3 centimeters (cm). For example, if all panes on a structure have a UWB capable radio (e.g., which may be used for additional communication modes), the relative positions of each of the panes may be determined with a relatively high amount of accuracy. In some instances, if a pane size and a pane shape are known, a highly accurate map indicating the orientation of the panes may be constructed. Further, a user entering a room with a smartphone equipped with a UWB capable radio may quickly determine pane groupings in a room and relative orientations (e.g., as a system would determine that the smartphone was held by a user in a position four or five feet above the ground).

In some aspects, one or more panes may have a different or unique size and/or shape relative one or more other panes associated with a particular area. For example, a first pane, a second pane, and a third pane may be located on a first wall. The first pane may have a rectangular shape with a first amount of area. The second pane may also have a rectangular shape with a second amount of area that is larger than the first amount of area. The third pane may have a rounded shaped different from the shape of the first pane and the shape of the second pane. Upon receiving a first indication indicative of a first ID unique to the first pane, the first ID unique to the first pane may be confirmed based on the first ID being associated with a pane having the rectangular shape and the first amount of area. In addition, upon receiving a second indication indicative of a second ID unique to the second pane, the second ID unique to the second pane may be confirmed based on the second ID being associated with a pane having the rectangular shape and the second amount of area. Further, upon receiving a third indication indicative of a third ID unique to the third pane, the third ID unique to the third pane may be confirmed based on the third ID being associated with a pane having the rounded shape. Based on associating the received indications with the respective sizes and/or shapes of the panes, even without accurate or precise signal strength and/or signal direction information from each of the panes, an accurate map of the panes may be formulated.

In some aspects, a communication node of the system may include a camera. The camera (e.g., a camera of a smartphone) may be used to capture an image, a series of images, or a video of a façade or structure including electrochromic glass panes. The façade and/or the individual panes may provide a visible display with information about an identification of one or more particular panes. For example, the visible indication may be positioned on a pane and include a visible light indicator (e.g., an LED) that flashes in a pattern indicative of a unique identification (ID) associated with the pane. When the camera receives (e.g., records) the flashed pattern of the visible light indicator of the pane, the system may map the unique ID of the pane provided by the visible light indicator on the pane with the location or position (e.g., relative location, relative position) of the pane captured by the camera. The system may receive, from the camera, an image of a plurality of panes and identify sections of the image as individual panes for mapping with unique IDs. As another example, a plurality of visible indications may be positioned on respective panes and include visible light indicator (e.g., an LED). The visible light indicators of the respective panes may flash in a sequence and based on particular relative timing that are indicative of unique IDs associated with the respective panes. When the camera receives (e.g., records) the sequenced flashes from each of the visible light indicators on the respective panes, the system may map the unique IDs of the respective panes provided by the visible light indicators on the panes with the location or position (e.g., relative location, relative position) of the respective panes captured by the camera. The system may receive, from the camera, an image of a plurality of panes and identify sections of the image as individual panes for mapping with unique IDs.

As yet another example, the visible indication may be positioned on a pane and include a tag or sticker indicative of a unique identification (ID) associated with the pane. When the camera receives (e.g., records) the tag or sticker of the pane, the system may map the unique ID of the pane provided by the tag or sticker on the pane with the location or position (e.g., relative location, relative position) of the pane captured by the camera. The system may receive, from the camera, an image of a plurality of panes and identify sections of the image as individual panes for mapping with unique IDs. In some aspects, the tag or sticker may include an indication of the actual ID unique to the pane. Additionally, or alternatively, the tag or sticker may include a matrix code, bar code, QR code, text, and/or other images or symbols associated with and/or indicating a unique ID of the pane. In some aspect the tag or sticker may be removed after the ID of the pane is mapped to the location of the pane.

As yet another example, the visible indication may include a change in opacity of individual panes over time. For example, as similarly described herein, a communication node of the system may include a camera or a plurality of cameras. The camera(s) (e.g., a camera of a smartphone or a stationary camera) may be used to capture an image, a series of images, or a video of a façade or structure including electrochromic glass panes. The opacity of the each of panes may be modulated, one-by-one, in accordance with specific pane ID, while the camera(s) record(s) the individual panes changing opacity. The system may map a position of the pane with a change in opacity of the pane and a correlating ID. Overtime a plurality of panes may be modulated to change opacity for formulating a mapping of ID to pane positions on the façade or the structure. For instance, a plurality of panes may be tinted to mid-range. A serial number or an address of the pane may be expressed in binary '0' being 'become clearer for 10 seconds' and '1' represented as 'become more tinted for 10 seconds.'" By comparing a range of panes, the system may determine the correlating IDs. It should be understood that in any example, the communication node (e.g., the camera(s)) may be position either inside or outside the structure.

In some aspects, the electrochromic glass panes may each include a light sensor. The respective light sensors may be facing towards an exterior of the structure or the interior of the structure. As light sources inside the structure and/or outside the structure, having the electrochromic glass panes, change in location relative to the panes and/or increase or decrease in light intensity through the panes, the opacity or tint of the panes may change accordingly. The camera may capture images of the panes over a period of time (e.g., hours, days, weeks, months, etc.) and identify patterns or similarly occurring changes in light source direction or intensity. For example, motion of the sun may indicate the compass orientation for determining or approximating a position of a pane. As another example, as an object moves along an interior or an exterior of a series of panes, casting a shadow, the relative positions of the series of panes may be determined as the shadow moves across each of the panes. As yet another example, as shadows move across an interior or exterior of a series of panes, these shadows will also move across the series of panes for determining a relative a position of the panes. Further, as interior lights are turned on and/or off, the change in light intensity through the panes may vary based on a distance between a particular pane and the interior light. The change in light intensity through the panes may be used to determine which panes are within a range of a given light source and/or the relative position of different panes based on a respective pane's response to a change in light intensity occurring as a result one or more light sources turning on and/or off. As another example, exterior sensors, all facing in a same direction, may generally read differently when positioned near the ground compared to when they are positioned higher up and away from the ground depending on albedo (e.g., reflective power) of the ground. If the ground is dark, then light intensity readings from sensors near the ground will be lower compared to light intensity reading when the ground is lighter. If the ground is highly reflective (e.g., due to fresh snow), then light intensity readings from sensors near the ground will be higher.

In some aspects, the electrochromic glass panes may each include an image sensor. For example, each pane may include a low-resolution image sensor for measuring light intensity levels, light distribution, and/or glare. Panes may be positioned together so that an image sensor of a respective pane may have an overlapping field view with an image sensor of an adjacent respective pane. The correlation between images received from image sensors of adjacent panes may be used to determine or map relative positions of panes with clear above, below, and side (e.g., next to) information. In some aspects, the image sensors may be externally facing (e.g., facing outside a building), internally facing (e.g., facing inside a building), or both externally and internally facing (e.g., a single image sensory using a fish-eye lens facing up or facing down to capture both interior and exterior information). It should be understood that from a privacy perspective, the image sensor may have a very low-resolution image sensor with low quality lenses to provide acceptable privacy.

In some embodiments, a system, such as at a customer-site, includes one or more computing devices configured to implement a system for an electrochromic glass system installed or to be installed at the customer-site. The system includes a database import interface, configured to import a pre-populated database for the electrochromic glass system, wherein the pre-populated database comprises respective indications of individual panes and positions or locations for mounting panes. The respective panes stored in the pre-populated database may not be mapped to a respective position or location stored in the pre-populated database for mounting the pane. Also, the system may include a controller configuration module configured to control one or more of the respective panes (e.g., through wireless communication). However, because the system may not be able to determine, verify, or map the installed location or position of a respective pane among the positions or location stored in the pre-populated database in order to properly control that respective pane, the system may utilize the concepts provided herein to perform that mapping. In some embodiments, one or more control algorithms for the controller(s) may be specified in the pre-populated databased imported via a database import interface.

In some embodiments, a computer-readable medium stores program instructions, that when executed on one or more processors, cause the one or more processors to receive a first indication from a first electrochromic glass pane, wherein the first indication is associated with a first ID unique to the first electrochromic glass pane, receive a second indication from a second electrochromic glass pane, based on receiving the first indication and the second indication, determine a relative position of the first electrochromic glass pane relative to a position of the second electrochromic glass pane, map the relative position of the first pane to the first ID.

In some embodiments, there are at least three phases involved in configuring a system for a set of electrochromic glass units, also referred to herein as insulated glass units or IGUs. First there is an up-front configuration phase, wherein IGUs are selected to be included in a project and where a layout for the IGUs on one or more facades, such as of a building, are determined. Often the up-front configuration phase is performed by a designer or other person working for or with a provider of the electrochromic glass units or IGUs, such as a manufacturer of the electrochromic glass units. Next a commissioning phase is performed, wherein the electrochromic glass units (e.g., IGUs) are installed at a customer site at one or more positions or locations on a façade. Often a different set of personnel perform on-site installation than a group of personnel that performed the design as part of the up-front configuration. Finally, an ongoing operational control phase is performed to control the electrochromic glass units (e.g., IGUs) using a system installed at the customer-site. The system may control of a plurality of local controllers, each associated with a respective electrochromic glass unit (e.g., IGU) and/or an associated position or location on a structure or façade (e.g., a building or a wall of a building). In some aspects, panes may be controlled by a controller or controllers linked to a particular position or location. In these cases, links may require verification to determine whether the proper controller is linked to the proper position to control the pane. In some aspects, panes may be linked (e.g., wirelessly) to a particular controller regardless of position or location. In these cases, associations or mappings may need to be verified or determined to associate a particular pane with a particular position on a façade.

In some embodiments, a system at the customer-site may execute a discovery process to discover controllers, panes, pane positions on a façade, and/or other devices, such as sensors, connected to a local network at the customer-site. In some embodiments, each device, such as a controller and/or a pane may be delivered to a customer-site with a pre-installed dynamic host configuration protocol (DHCP) module. The DHCP module may advertise a dynamic Internet Protocol (IP) address over the network to the system connected to the network. The system may then initiate or receive communications with the device (e.g., controller, a pane) using the dynamic IP address and determine a device ID of the device, such as a controller ID for a controller, a pane ID unique to pane. The system may further determine that the device ID (e.g., controller ID, pane ID) is included in a pre-populated project database for the electrochromic glass system and may further assign a static IP address to the device (e.g., controller, pane) and add the static IP address for the device (e.g., controller, pane) to the project database for the electrochromic glass system. The system at the customer-site may currently or subsequently perform a similar process for other devices, such as controllers, of the electrochromic glass system installed at the customer-site. As described herein, the system may use the dynamic IP address and/or the static IP address of each of the respective panes to determine whether the proper controller is linked to the proper position to control the pane and/or to map the respective panes to a position (e.g., a relative position) on a façade.

In addition to mapping IGU to pane positions on a facade, in some embodiments a project database may include other mappings, such as: mappings for daylight and glare algorithms, zone mappings for zone based control, scene creation mappings, wherein a set of IGUs are controlled in a coordinated fashion to create a scene, such as a company logo, etc. All of these mappings may depend on knowing where specific IGUs are positioned on a facade, such as a wall of a building. Also, in some embodiments a system and database may automatically update these various types of mappings based on updates received either via a graphical interface, other user interface, or database import. For example, a system at a provider-side-site may update such mappings in response to receiving as-built information about an electrochromic glass system via an updated database import interface, as an example.

FIG. 1A illustrates an example system 100 for mapping one or more panes according to some aspects. As shown in FIG. 1A, the system 100 may include a façade or structure 102 (e.g., of a building) having a plurality of panes 104. For example, the structure 102 may have a plurality of panes 104 including at least a first pane 104a, a second pane 104b, and a third pane 104c. Each pane of the plurality of panes 104 may be an IGU and/or an electrochromic glass pane as described herein. Each of the plurality of panes 104 may be located at a particular position or location on the structure 102. For example, the first pane 104a may be positioned or located at a first position 106a, the second pane 104b may be positioned or located at a second position 106b, and the third pane 104c may be positioned or located at a third position 106c. In some aspects, each of the plurality of panes 104 may include an indication provider device. For example, as shown in FIG. 1A, the first pane 104a may include a first indication provider device 108a, the second pane 104b may include a second indication provider device 108b, and the third pane 104c may include a third indication provider device 108c.

In some aspects, the respective indication provider devices may include a transmitter (e.g., a transceiver) for transmitting a signal including an indication of an identification (ID) associated with the respective pane. For example, the first indication provider device 108a may include a first transmitter configured to transmit a first signal including a first indication having a first ID uniquely associated with the first pane 104a. As another example, the second indication provider device 108b may include a second transmitter configured to transmit a second signal including a second indication having a second ID uniquely associated with the second pane 104b. As yet another example, the third indication provider device 108c may include a third transmitter configured to transmit a third signal including a third indication having a third ID uniquely associated with the third pane 104c. In some aspects, the computing system node 114 may include a receiver (e.g., a transceiver) that receives the first signal from the first indication provider device 108a via a first path 110a, the second signal from the second indication provider device 108b via a second path 110b, and the third signal from the third indication provider device 108c via a third path 110c. Based on a respective direction from which each of the signals are received by the computing system node 114 and/or a respective signal strength of each of the respective signals received by the computing system node 114, the computing system 118, in communication with the computing system 114 via the communication channel 116, may determine a position of the first pane 104a relative to a position of the second pane 104b and/or relative to a position of the third pane 104c. Additionally, or alternatively, based on a respective direction from which each of the signals are received by the computing system node 114 and/or a respective signal strength of each of the respective signals received by the computing system node 114, the computing system 118 may determine a position of the second pane 104b relative to a position of the first pane 104a and/or relative to a position of the third pane 104c. Additionally, or alternatively, based on a respective direction from which each of the signals are received by the computing system node 114 and/or a respective signal strength of each of the respective signals received by the computing system node 114, the computing system 118 may determine a position of the third pane 104c relative to a position of the first pane 104a and/or relative to a position of the second pane 104b.

For example, the computing system node 114 may receive the first signal from the first indication provider device 108a and the second signal from the second indication provider device 108. The computing system 118 may determine that the first signal was received at a first angle relative to a surface of the computing system node 114 and with a first signal strength. The computing system 118 may also determine that the second signal was received at a second angle different from the first angle and relative to the surface of the computing system node 114 and with a second signal strength different from the first signal strength. Based on the first angle, the first signal strength, the second angle, and the second signal strength, the computing system 118 may determine a position of the first pane 104a relative to a position of the second pane 104b. Additionally, or alternatively, the computing system 118 may determine that the third signal was received at a third angle different from the first angle and the second angle and relative to the surface of the computing system node 114 and with a third signal strength different from the first signal strength and the second signal strength. Based on the first angle, the first signal strength, the second angle, the second signal strength, the third angle, and the third signal strength, the computing system 118 may determine a position of the first pane 104a, the second pane 104b, and/or the third pane 104c relative to each other. It should be understood that if the first signal strength is greater than the second signal strength but less than the third signal strength, then the third pane may be closest to the computing system node 114, the first pane 104a may be further from the computing system node 114 than the third pane 104c, and the second pane 104b may be further from the computing system node 114 compared to the first pane 104a and the third pane 104c.

Subsequently, the computing system 118 may associate the respective indications to respective IDs unique to the respective panes and map the respective IDs to the relative positions of the panes. For example, upon receiving the first signal, the second signal, and/or the third signal, via the computing system node 114, the computing system 118 may associate the received indications with respective unique IDs. In some aspects, the indications may include the unique IDs such that when the computing system 118 receives the indications, the computing system 118 may immediately know the unique IDs. In some aspects, the computing system 118 may store a table associating indications with unique IDs. For example, upon receiving the first signal, via the computing system node 114, the computing system 118 may associate the first indication provided by the first signal with a unique first ID using a table stored in a memory of the computing system 118. The computing system 118 having determined the relative position of the first pane 104a based on receiving the first signal may map the first unique ID to the determined relative position of the first pane 104a. As another example, upon receiving the second signal, via the computing system node 114, the computing system 118 may associate the second indication provided by the second signal with a unique second ID using the table stored in the memory of the computing system 118. The computing system 118 having determined the relative position of the second pane 104b based on receiving the second signal may map the second unique ID to the determined relative position of the second pane 104b. As yet another example, upon receiving the third signal, via the computing system node 114, the computing system 118 may associate the third indication provided by the third signal with a unique third ID using the table stored in the memory of the computing system 118. The computing system 118 having determined the relative position of the third pane 104c based on receiving the third signal may map the third unique ID to the determined relative position of the third pane 104c.

In some aspects, the computing system 118 may have determined and/or stored a position of the computing system node 114. Based on the relative position of a respective pane and the position of the computing system node 114, the computing system 118 may determine an actual position of the respective pane. For example, upon receiving the first signal, via the computing system node 114, the computing system 118 may determine the relative position of the first pane 104a. The computing system 118, having the position of the computing system node 114, may use the relative position of the first pane 104a to determine the actual position of the first pane 104a. The computing system may then map the first unique ID to the determined actual position of the first pane 104a. As another example, upon receiving the second signal, via the computing system node 114, the computing system 118 may determine the relative position of the second pane 104b. The computing system 118, having the position of the computing system node 114, may use the relative position of the second pane 104b to determine the actual position of the second pane 104b. The computing system may then map the second unique ID to the determined actual position of the second pane 104b. As yet another example, upon receiving the third signal, via the computing system node 114, the computing system 118 may determine the relative position of the third pane 104c. The computing system 118, having the position of the computing system node 114, may use the relative position of the third pane 104c to determine the actual position of the third pane 104c. The computing system may then map the third unique ID to the determined actual position of the third pane 104c. In some aspects, this system may be utilized with a wireless power transfer system.

Figure 1B:
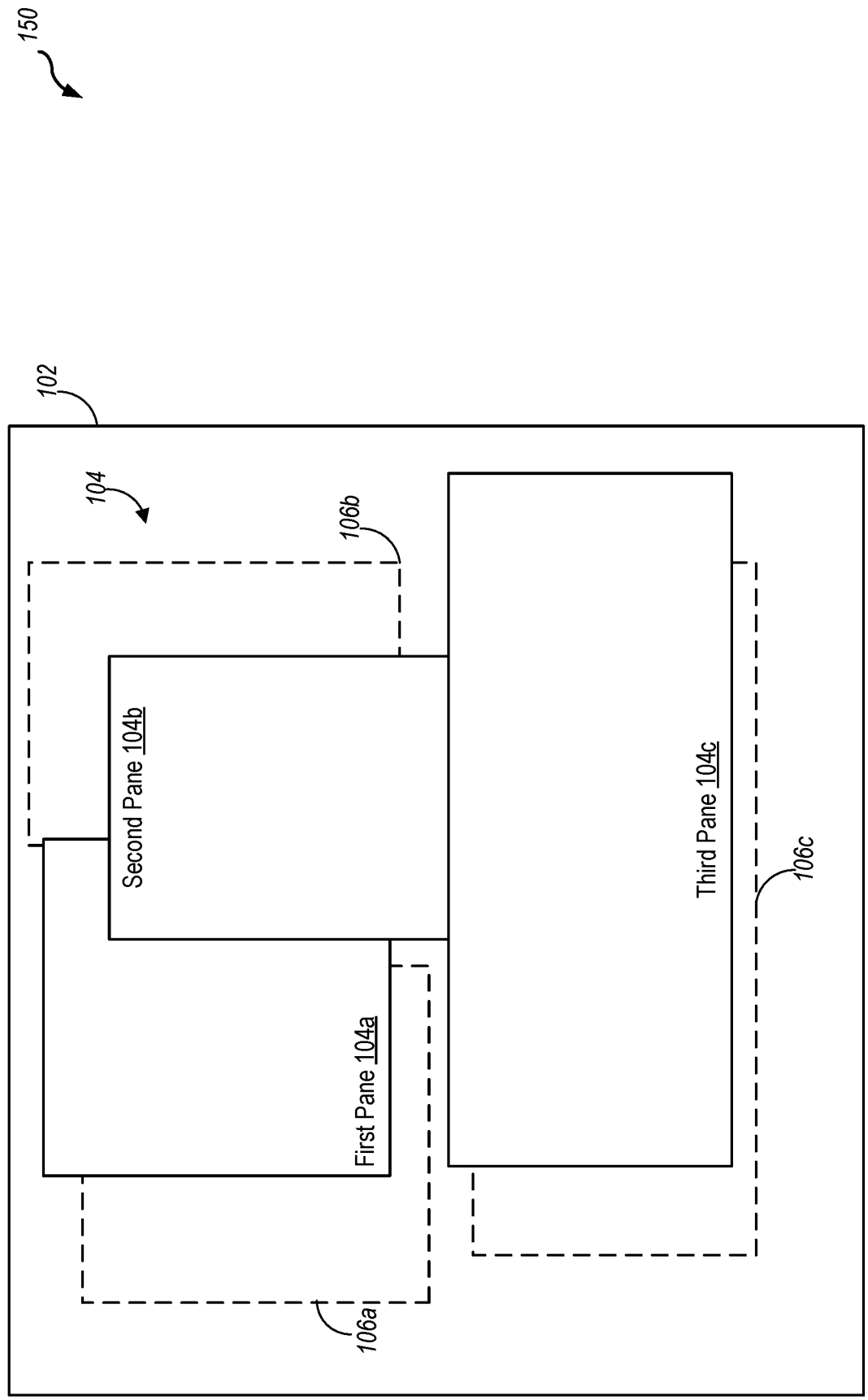
FIG. 1B illustrates an example raw mapping of a plurality of panes according to some aspects.

In some aspects, the first signal, the second signal, and/or the third signal may be inaccurate signals having inaccurate signal strength and inaccurate directional information producing a map as shown in FIG. 1B. FIG. 1B illustrates an example raw mapping 150 of the first pane 104a, the second pane 104b, and the third pane 104c based on the magnitudes and directions of the received first signal, the received second signal, and the received third signal, the raw mapping of the panes may show the first pane 104a out of the first position 106a and overlapping the second pane 104b, the second pane 104b out of the second position 106b and overlapping the third pane 104b, and the third pane 104c offset from the third position 106c. Based on the inaccurate signal information provided by the first signal, the second signal, and third signal to generate the raw mapping 150, the computing system 118 may infer that the panes do not overlap, the panes are all in a same plane, and the panes are aligned in predetermined configuration (e.g., according to the first position 106a, the second position 106b, and the third position 106 or according panes being lined up in a row). The computing system 118 may then determine that the first pane 104a is located at the first position 106a, the second pane 104b is located at the second position 106b, and the third pane 104c is located at the third position 106c and configure a map of the panes according to their respective positions.

In some aspects, as described herein, one or more panes may have a different or unique size and/or shape relative one or more other panes associated with a particular area. For example, as shown in FIG. 1A and FIG. 1B, the first pane 104a may have a square shape, the second pane may have a tall rectangular shape, and the third pane may have a wide rectangular shape. Upon receiving the first indication indicative of the first ID unique to the first pane 104a, the computing system 118 (also knowing up from down) may confirm that the first ID is associated with the first pane 104a based on the first ID being associated with a pane having the square shape. In addition, upon receiving the second indication indicative of the second ID unique to the second pane 104b, the computing system 118 (also knowing up from down) may confirm that the second ID is associated with the second pane 104b based on the second ID being associated with a pane having a tall rectangular shape. Further, upon receiving the third indication indicative of the second ID unique to the second pane 104b, the computing system 118 (also knowing up from down) may confirm that the third ID is associated with the third pane 104c based on the third ID being associated with a pane having a wide rectangular shape. Based on associating the received indications with the respective sizes and/or shapes of the panes, even without accurate or precise signal strength and/or signal direction information from each of the panes, an accurate map of the panes may be formulated.

Turning back to FIG. 1A, additionally, or alternatively, the first indication provider device 108a may include a transceiver that receives the second signal from the second indication provider device 108b via a first side path 112a, and the third signal from the third indication provider device 108c via a second side path 112b. Subsequently, the first indication providing device 108a may transmit, to the computing system node 114, a single message including the first indication associated with the first ID unique to the first pane 104a, the second indication provided in the second signal, and/or the third indication provided in the third signal. For example, the first indication provider device 108a may receive the second signal from the second indication provider device 108b and containing the second indication and/or the third signal from the third indication provider device 108c and containing the third indication. The first indication provider device 108a may determine that the second signal was received at a second angle relative to a surface of the first indication provider device 108a and with a second signal strength. The first indication provider device 108a may determine that the third signal was received at a third angle relative to the surface of the first indication provider device 108a and with a third signal strength. The second angle may be different from the third angle and the second signal strength may be different from the third signal strength. After receiving the second signal and the third signal and determining the angle and signal strength of each of the second signal and the third signal, the first indication provider device 108a may generate a single signal or message including the first indication associated with the first pane 104a, the second indication, the second angle, the second signal strength, the third indication, the third angle, and the third signal strength. Subsequently, the first indication provider device 108a may transmit the single signal or message to the computing system node 114.

Upon receiving the single signal or message from the first indication provider device 108a, the computing system node 114 may determine that the single signal or message was received at a first angle relative to a surface of the computing system node 114 and with a first signal strength. Based on the first angle, the first signal strength, the second angle, the second signal strength, the third angle, and the third signal strength, the computing system 118 may determine a position of the first pane 104a, the second pane 104b, and/or the third pane 104c relative to each other. It should be understood that if the first signal strength is greater than the second signal strength but less than the third signal strength, then the third pane may be closest to the computing system node 114, the first pane 104a may be further from the computing system node 114 than the third pane 104c, and the second pane 104b may be further from the computing system node 114 compared to the first pane 104a and the third pane 104c.

Subsequently, the computing system 118 may associate the respective indications to respective IDs unique to the respective panes and map the respective IDs to the relative positions of the panes. For example, upon receiving the single signal or message, via the computing system node 114, the computing system 118 may associate the received indications with respective unique IDs. In some aspects, the indications may include the unique IDs such that when the computing system 118 receives the indications, the computing system 118 may immediately know the unique IDs. In some aspects, the computing system 118 may store a table associating indications with unique IDs. For example, upon receiving the single signal or message, via the computing system node 114, the computing system 118 may associate the first indication provided by the single signal or message with a unique first ID using a table stored in a memory of the computing system 118. The computing system 118 having determined the relative position of the first pane 104a based on receiving the single signal or message may map the first unique ID to the determined relative position of the first pane 104a. As another example, upon receiving the second indication provided in the single signal or message, via the computing system node 114, the computing system 118 may associate the second indication provided by the second signal with a unique second ID using the table stored in the memory of the computing system 118. The computing system 118 having determined the relative position of the second pane 104b based on the second angle and the second signal strength of the second signal may map the second unique ID to the determined relative position of the second pane 104b. As yet another example, upon receiving the third indication provided in the single signal or message, via the computing system node 114, the computing system 118 may associate the third indication provided by the third signal with a unique third ID using the table stored in the memory of the computing system 118. The computing system 118 having determined the relative position of the third pane 104c based on the third angle and the third signal strength of the third signal may map the third unique ID to the determined relative position of the third pane 104c.

In some aspects, the computing system 118 may have determined and/or stored a position of the computing system node 114. Based on the relative position of a respective pane and the position of the computing system node 114, the computing system 118 may determine an actual position of the respective pane. For example, upon receiving the single signal or message, via the computing system node 114, the computing system 118 may determine the relative position of the first pane 104a. The computing system 118, having the position of the computing system node 114, may use the relative position of the first pane 104a to determine the actual position of the first pane 104a. The computing system may then map the first unique ID to the determined actual position of the first pane 104a. As another example, upon receiving the single signal or message including the second indication, the second angle, and/or the second signal strength, via the computing system node 114, the computing system 118 may determine the relative position of the second pane 104b. The computing system 118, having the position of the computing system node 114, may use the relative position of the second pane 104b to determine the actual position of the second pane 104b. The computing system may then map the second unique ID to the determined actual position of the second pane 104b. As yet another example, upon receiving the single signal or message including the third indication, the third angle, and/or the third signal strength, via the computing system node 114, the computing system 118 may determine the relative position of the third pane 104c. The computing system 118, having the position of the computing system node 114, may use the relative position of the third pane 104c to determine the actual position of the third pane 104c. The computing system may then map the third unique ID to the determined actual position of the third pane 104c.

In some aspects, the systems described herein may utilize wireless power transfer techniques to provide accurate information about orientation and/or distance of electrochromic glass pane receivers with respect to a transmitter. For example, a location of each pane served by a node or an indication provider device (e.g., a transmitter) may be accurately mapped in relation to one or more other panes. In some aspects, if there is overlap and multiple nodes (e.g., multiple transmitters, multiple computing system nodes 114) can wirelessly reach some of the receivers (e.g., the first indication provider device 108a, the second indication provider device 108b, the third indication provider device 108c), a more extensive pane orientation map may be constructed. Additionally, or alternatively, a location of each of the indication provider devices may be mapped (e.g., using a global positioning system (GPS), manually recording the location of the transmitter) to determine the location of each pane. Wireless power transfer techniques may provide accurate information about orientation and/or distance information using radio frequency (RF) with phased-array antennas or directionally focused light or infrared (e.g., a split-cavity laser).

As described herein, each pane of the system and/or in communication with the system may have a wireless communication node (e.g., a transceiver). Transmission from any one pane to another pane may provide a signal strength (e.g., received signal strength indicator (RSSI)) measurable by the receiver of the signal. Measurement of the signal strength may be used to determine a distance between panes in order to determine a relative distance between panes. For example, by measuring a complete map of interactions (e.g., signal strengths) between pairs of panes, the relative positions of each of the panes may be determined. For instance, a signal may be transmitted from each pane. Each of the panes receiving the transmitted signals may measure a signal strength of each respective received signal. Each of the panes may share the signal strengths of each of the signals from the other panes for assembling a matrix and creating a map of the panes. It should be understood that not every signal strength from every pane may be needed. In some instances, rather than forming a complete map, partial mapping may be used where each pane has a signal strength to at least two other panes to determine the map. In some cases, pane-to-pane information may be combined with the signals between each pane and a central location (e.g., a component of the system, a mobile device) for better resolution and to also assign the panes to rooms or with other features of a building or wall.

Figure 2:
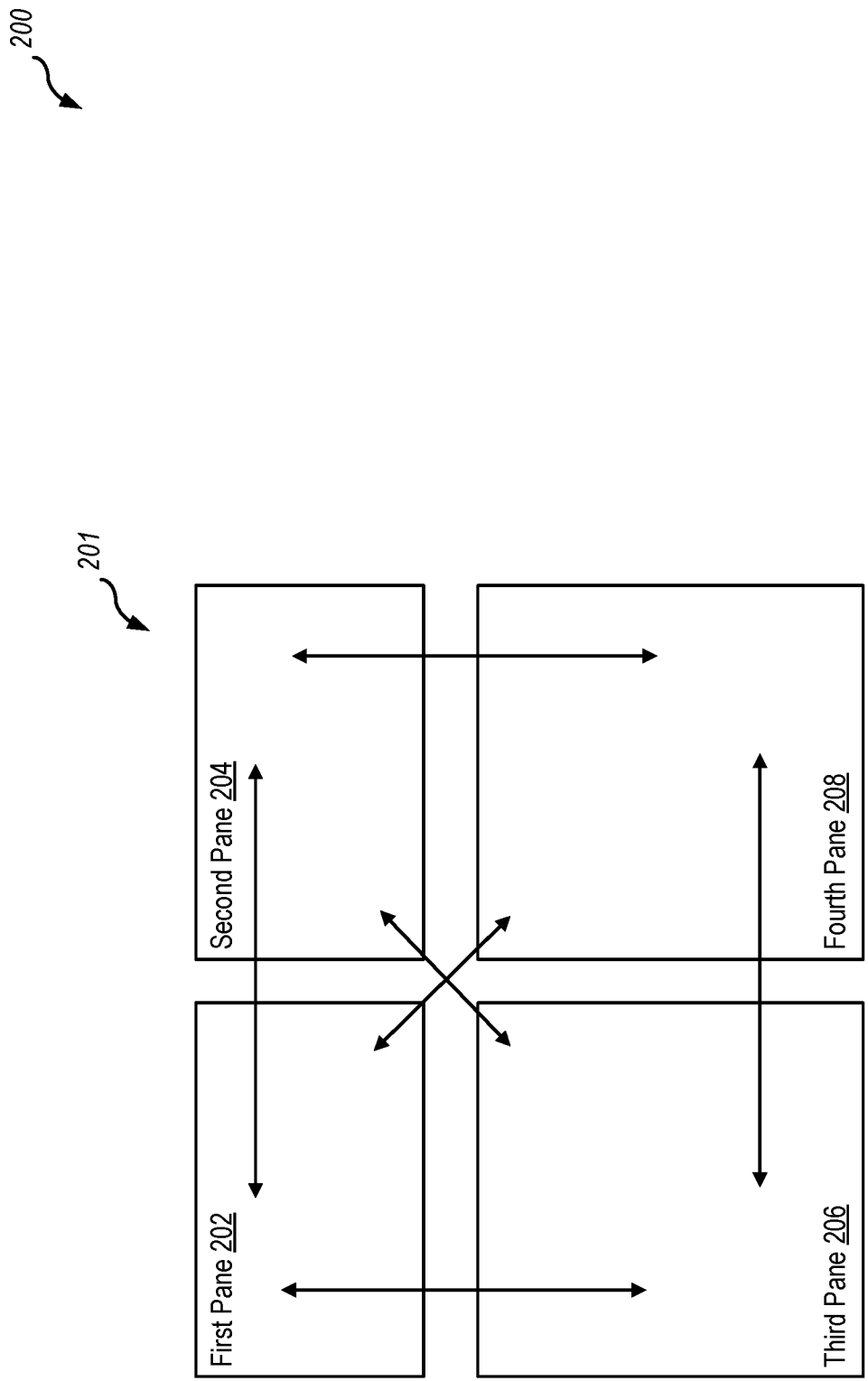
FIG. 2 illustrates an example conceptual illustration of communication between panes according to some aspects.
Figure 3:
FIG. 3 illustrates an example signal strength map according to some aspects.

FIG. 2 illustrates an example conceptual illustration 200 of communication between panes according to some aspects. As shown in FIG. 2, the plurality of panes 201 includes a first pane 202, a second pane 204, a third pane 206, and a fourth pane 208. Using a transceiver (e.g., a transceiver of an indication provider device), each the panes may transmit signals for reception by the other panes for generating a map of relative pane positions among the plurality of panes 201. FIG. 3 illustrates an example signal strength map 300 according to some aspects. In some aspects, the signal strength map may correlate with the plurality of panes 201 illustrated in FIG. 2. As shown in FIG. 3, the signal strength of a signal transmitted between the first pane 202 and the second pane 204 may have a magnitude of 1.0. The signal strength of a signal transmitted between the first pane 202 and the third pane 206 may have a magnitude of 0.8. The signal strength of a signal transmitted between the first pane 202 and the fourth pane 208 may have a magnitude of 0.5. The signal strength of a signal transmitted between the second pane 204 and the third pane 206 may have a magnitude of 0.5. The signal strength of a signal transmitted between the second pane 204 and the fourth pane 208 may have a magnitude of 0.8. The signal strength of a signal transmitted between the third pane 206 and the fourth pane 208 may have a magnitude of 1.0. The signal strengths may be calculated by a processor mounted with a pane, a plurality of respective processors on each of the panes, and/or by a computing system (e.g., computing system 118 illustrated in FIG. 1). Also, as shown in FIG. 2, the first pane 202 and the second pane 204 are smaller than the third pane 206 and the fourth pane 208. Upon receiving the signal strengths from each of the panes, a computing system (e.g., computing system 118 illustrated in FIG. 1A or a user may be to easily determine which pane is which and/or the correct orientation based the first pane 202 and the second pane 204 being smaller than the third pane 206 and the fourth pane 208.

Figure 4:
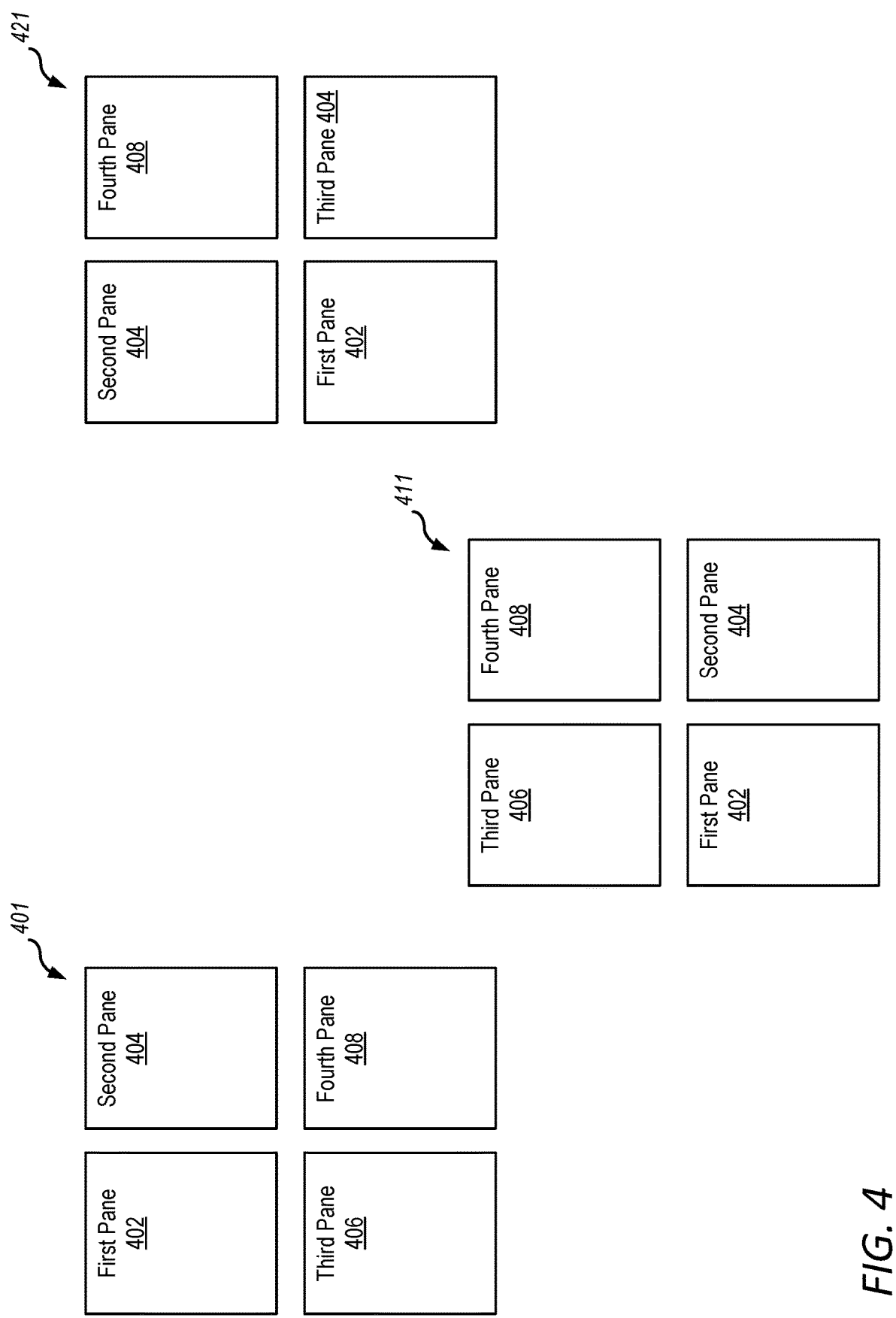
FIG. 4 illustrates an example of concepts diagrams of pane configurations according to some aspects.

FIG. 4 illustrates an example of concepts diagrams of pane configurations according to some aspects. As shown in FIG. 4, a first pane configuration 401 arranges the first pane 202 in a top left orientation, the second pane 204 in a top right orientation, the third pane 206 in a bottom left orientation, and the fourth pane 208 in a bottom right orientation. Also, as shown in FIG. 4, a second pane configuration 411 arranges the first pane 202 in a bottom left orientation, the second pane 204 in a bottom right orientation, the third pane 206 in a top left orientation, and the fourth pane 208 in a top right orientation. Further, as shown in FIG. 4, a third pane configuration 421 arranges the first pane 202 in a bottom left orientation, the second pane 204 in a top left orientation, the third pane 206 in a bottom right orientation, and the fourth pane 208 in a top right orientation. After determining the signal strengths between the panes and the relative positions of the panes, the computing system may provide configurations such as the first configuration 401, the second configuration 411, and/or the third configuration 421 for selection by a user to identify an actual configuration of the panes.

In some aspects, each pane of the system and/or in communication with the system may have a wireless communication node (e.g., transceiver) for performing ultrawide band (UWB) communications between panes. UWB communications may be able to measure distances from point to point (e.g., pane to pane) with accuracy of about 2 or 3 centimeters (cm). For example, if all panes on a structure have a UWB capable radio (e.g., which may be used for additional communication modes), the relative positions of each of the panes may be determined with a relatively high amount of accuracy. In some instances, if a pane size and a pane shape are known, a highly accurate map indicating the orientation of the panes may be constructed. Further, a user entering a room with a smartphone equipped with a UWB capable radio may quickly determine pane groupings in a room and relative orientations (e.g., as a system would determine that the smartphone was held by a user in a position four or five feet above the ground).

Returning to FIG. 1A, in some aspects, the indication provider devices may include a visual display as the indication associated with an ID unique to the respective pane. For example, the first indication provider device 108a may include a first visual display, the second indication provider device 108b may include a second visual display, and the third indication provider device 108c may include a third visual display. In some aspects, the computing system node 114 may include a camera for capturing one or more image(s) and/or a recording of a video of the visual displays (e.g., the first pane 104a, the second pane 104b, and/or the third pane 104c). For example, a camera of the computing system node 114 may capture an image or video of the first visual display, the second visual display, and/or the third visual display. Based on a camera of the computing system node 114 capturing an image or a video of the first visual display, the second visual display, and/or the third visual display, the computing system 118 may determine a relative position of the first pane 104a, the second pane 104b, and/or the third pane 104c relative to at least one other pane. In some aspects, each of the visual displays may be and/or may provide an indication of an ID unique to a respective pane. For example, a first visual display may be and/or may provide an indication of a first ID unique to the first pane 104a. A second visual display may be and/or may provide an indication of a second ID unique to the second pane 104b. A third visual display may be and/or may provide an indication of a third ID unique to the third pane 104c. It should be understood that some indications described herein may be visual displays utilizing one or more light emissions within the visual wavelength range of the electromagnetic spectrum. Additionally, or alternatively, some indications described herein may be one or more non-visible light emissions of one or more non-visible wavelength ranges of the electromagnetic spectrum (e.g., infrared light).

In some aspects, upon receiving the first visual display, via the computing system node 114, the computing system 118 may associate the first visual display with a unique first ID using a table stored in a memory of the computing system 118. The computing system 118 having determined the relative position of the first pane 104a based on receiving the image of the first visual display may map the first unique ID to the determined relative position of the first pane 104a. As another example, upon receiving the second visual display, via the computing system node 114, the computing system 118 may associate the second visual display with a unique second ID using the table stored in the memory of the computing system 118. The computing system 118 having determined the relative position of the second pane 104b based on receiving the image of the second visual display may map the second unique ID to the determined relative position of the second pane 104b. As yet another example, upon receiving the third signal, via the computing system node 114, the computing system 118 may associate the third indication provided by the third signal with a unique third ID using the table stored in the memory of the computing system 118. The computing system 118 having determined the relative position of the third pane 104c based on receiving the image of the third signal may map the third unique ID to the determined relative position of the third pane 104c.

In some aspects, each of the visual displays may include a visible light signal. The first visual display may include a first sequence of flashes from one or more light sources of the first pane 104a. For example, the computing system 118, via the communication channel 120, may cause the first pane 104a (e.g., the first indication provider device 108a) to initiate the first sequence of flashes. Based on the first sequence of flashes from the one or more light sources of the first pane 104a being captured or recorded by the camera of the computing system node 114, the computing system 118 may determine that the first sequence of flashes is associated with the first ID unique to the first pane 104a. The computing system 118 may also determine the relative position or location of the first pane 104a relative to at least one other pane (e.g., the second pane 104b and/or the third pane 104c) based on the captured image or recording of the first pane 104a and at least one of the second pane 104b or the third pane 104c. Subsequently, the computing system 118 may map the relative position of the first pane 104a to the first ID unique of the first pane 104a. It should be understood that while a visible light signal and/or other visible light (e.g., flashes) may be used herein, light outside the visible spectrum of the electromagnetic spectrum (e.g., infrared light) may be additionally or alternatively used.

In addition, the second visual display may include a second sequence of flashes from one or more light sources of the second pane 104b. For example, the computing system 118, via the communication channel 120, may cause the second pane 104b (e.g., the second indication provider device 108*b*) to initiate the second sequence of flashes. The second sequence of flashes from the one or more light sources of the second pane 104*b* may be a different sequence from the first sequence of flashes. Based on the second sequence of flashes from the one or more light sources of the second pane 104*b* being captured or recorded by the camera of the computing system node 114, the computing system 118 may determine that the second sequence of flashes is associated with the second ID unique to the second pane 104*b*. The computing system 118 may also determine the relative position or location of the second pane 104*b* relative to at least one other pane (e.g., the first pane 104*a* and/or the third pane 104*c*) based on the captured image or recording of the second pane 104*b* and at least one of the first pane 104*a* and/or the third pane 104*c*. Subsequently, the computing system 118 may map the relative position of the second pane 104*b* to the second ID unique to the second pane 104*b*.

Further, the third visual display may include a third sequence of flashes from one or more light sources of the third pane 104*c*. For example, the computing system 118, via the communication channel 120, may cause the third pane 104*c* (e.g., the third indication provider device 108*c*) to initiate the third sequence of flashes. The third sequence of flashes from the one or more light sources of the third pane 104*c* may be a different sequence from the first sequence of flashes and the second sequence of flashes. Based on the third sequence of flashes from the one or more light sources of the third pane 104*c* being captured or recorded by the camera of the computing system node 114, the computing system 118 may determine that the third sequence of flashes is associated with the third ID unique to the third pane 104*c*. The computing system 118 may also determine the relative position or location of the third pane 104*c* relative to at least one other pane (e.g., the first pane 104*a* and/or the second pane 104*b*) based on the captured image or recording of the second pane 104*b* and at least one of the first pane 104*a* and/or the third pane 104*c*. Subsequently, the computing system 118 may map the relative position of the second pane 104*b* to the second ID unique to the second pane 104*b*.

In some aspects, each of visual display may provide an indication in a sequence amongst one or more other visual displays. The computing system 118, via the communication channel 120 and/or using wireless transmission via the computing system node 114, may cause light sources of the respective visual displays of the respective indication provider devices of the plurality of panes 140 to initiate one or more flashes (e.g., a sequence of flashes). For instance, upon receiving a signal to initiate one or more flashes, each respective visual display of the plurality of panes may include a timer with a different time to initiate one or more flashes so that each visual display initiates a flash at a different time. For example, each of the first indicator provider device 108*a* having a first set of one or more lights, the second indicator provider device 108*b* having a second set of one or more lights, and the third indicator provider device 108*c* having a third set of one or more lights may receive (at a same time) as signal from the computing system 118 to initiate a flash. The first indicator provider device 108*a* may initiate one or more flashes at a first time after receiving the signal, the second indicator provider device 108*b* may initiate one or more flashes at a second time (e.g., different from the first time) after receiving the signal, and the third indicator provider device 108*c* may initiate one or more flashes at a third time (e.g., different from the first time and the second time) after receiving the signal. The computing system node 114 having at least one camera may record each of the panes and the sequence by which each of the first indicator provider device 108*a*, the second indicator provider device 108*b*, and the third indicator provider device 108*c* initiates the one or more flashes. Based on the sequence of flashes between the first indicator provider device 108*a*, the second indicator provider device 108*b*, and the third indicator provider device 108*c*, the computing system 118 may determine that the first one or more flashes from the first indicator provider device 108*a* are associated with the first ID unique to the first pane 104*a*, that the second one or more flashes from the second indicator provider device 108*b* are associated with the second ID unique to the second pane 104*b*, and that the third one or more flashes from the third indicator provider device 108*c* are associated with the third ID unique to the third pane 104*c*. The computing system 118 may also determine the relative position or location of the first pane 104*a* relative to at least one other pane (e.g., the second pane 104*b* and/or the third pane 104*c*) based on the captured image or recording of the first pane 104*a* and at least one of the second pane 104*b* or the third pane 104*c*. Subsequently, the computing system 118 may map the relative position of the first pane 104*a* to the first ID unique of the first pane 104*a*, the relative position of the second pane 104*b* to the second ID unique of the second pane 104*b*, and the relative position of the third pane 104*c* to the third ID unique of the third pane 104*c*.

In some aspects, each visual display of each indication provider device may include one or more symbols (e.g., text, QC code, bar code, matrix code, and/or the like) that are unique to an associated pane. The symbols may be visible for viewing and/or capture by a camera, for example, of the computing system node 114. For instance, the first indicator provider device 108*a* of the first pane 104*a* may have a first set one or more symbols (e.g., one or more unique symbols) visible for capture by a camera, the second indicator provider device 108*b* of the second pane 104*b* may have a second set one or more symbols (e.g., one or more unique symbols) visible for capture by a camera, and the third indicator provider device 108*c* of the third pane 104*c* may have a third set one or more symbols (e.g., one or more unique symbols) visible for capture by a camera. The computing system node 114 having at least one camera may record each of the panes and the sets of one or more symbols of the first indicator provider device 108*a*, the second indicator provider device 108*b*, and the third indicator provider device 108*c*. Based on the sets of one or more symbols of the first indicator provider device 108*a*, the second indicator provider device 108*b*, and the third indicator provider device 108*c*, the computing system 118 may associate the first set of one or more symbols with the first ID unique with the first pane 104*a*, the second set of one or more symbols with the second ID unique to the second pane 104*b*, and the third set of one or more symbols with the third ID unique to the third pane 104*c*. The computing system 118 may also determine the relative position or location of the first pane 104*a*, the second pane 104*b*, and the third pane 104*c* based on the captured image or recording of the first pane 104*a*, the second pane 104*b* and the third pane 104*c*. Subsequently, the computing system 118 may map the relative position of the first pane 104*a* to the first ID unique of the first pane 104*a*, the relative position of the second pane 104*b* to the second ID unique of the second pane 104*b*, and the relative position of the third pane 104*c* to the third ID unique of the third pane 104*c*. In some aspects, the one or more symbols may be displayed on a sticker that is removed after mapping the relative positions of the panes to the respective unique IDs.

In some aspects, each indication provider device may provide a visible display by tinting the respective pane. The computing system 118, via the communication channel 120 and/or using wireless transmission via the computing system node 114, may cause individual panes to be set at an intermediate tint level (e.g., some tint, but not the most amount of tint). Subsequently, the computing system 118, via the communication channel 120 and/or using wireless transmission via the computing system node 114, may cause individual panes to initiate a tint change procedure so that some panes tint darker or lighter in accordance with a predetermined timing associated with the respective pane. For instance, upon receiving a signal to initiate a change in tint of each of the panes, each respective pane of the plurality of panes may initiate a change in tinting as a visual display so that each pane initiates a change in tint at a different time. Additionally, or alternatively, upon receiving a signal to initiate a change in tint of each of the panes, each respective pane of the plurality of panes 104 may initiate a change in tinting as a visual display so that each visual display initiates a change in tint for a different predetermined duration of time. For example, each of the first indicator provider device 108*a*, the second indicator provider device 108*b*, and the third indicator provider device 108*c* may receive (e.g., at a same time) a signal from the computing system 118 to initiate a change in tint of the pane. Upon receiving the signal, the first indicator provider device 108*a* may initiate a change in tinting at a first unique predetermined time and/or for a first unique predetermined duration of time, the second indicator provider device 108*b* may initiate a change in tinting at a second unique predetermined time and/or for a second unique predetermined duration of time, and the third indicator provider device 108*c* may initiate a change in tinting at a third unique predetermined time and/or for a third unique predetermined duration of time. It should be understood that while tinting may be initiated from a moderate amount of tinting as described herein, a change in tinting for each of the panes may, additionally, or alternatively, be initiated from a same or one or more different initial amount(s) of tinting (e.g., no tinting, a medium level of tinting, a highest level of tinting (darkest tinting), a predetermined amount of tinting, or the like) or from a current level of tinting of each respective pane. The computing system node 114 having at least one camera may record each of the panes and the timing and/or duration by which each of the first indicator provider device 108*a*, the second indicator provider device 108*b*, and the third indicator provider device 108*c* initiates the respective changes in pane tinting. Based on the timing and/or duration of the change in tinting between the first indicator provider device 108*a*, the second indicator provider device 108*b*, and the third indicator provider device 108*c*, the computing system 118 may determine that the first timing and/or duration of tinting change of the first indicator provider device 108*a* is associated with the first ID unique to the first pane 104*a*, that the second timing and/or during of tinting change of the second indicator provider device 108*b* is associated with the second ID unique to the second pane 104*b*, and that the third timing and/or during of tinting change of the third indicator provider device 108*c* is associated with the third ID unique to the third pane 104*c*. The computing system 118 may also determine the relative position or location of the first pane 104*a* relative to at least one other pane (e.g., the second pane 104*b* and/or the third pane 104*c*) based on the captured image or recording of the first pane 104*a* and at least one of the second pane 104*b* or the third pane 104*c*. Subsequently, the computing system 118 may map the relative position of the first pane 104*a* to the first ID unique of the first pane 104*a*, the relative position of the second pane 104*b* to the second ID unique of the second pane 104*b*, and the relative position of the third pane 104*c* to the third ID unique of the third pane 104*c*.

As described herein, the computing system 118 may determine a relative position of each pane of a plurality of panes based on GPS information provided by individual panes or determined for individual panes, a signal strength provided from a respective transmitter or transceiver of each of the respective panes, and/or by capturing an image or recording of the plurality of panes. Additionally, or alternatively, the computing system 118 may determine a relative position of each of the plurality of panes using one or more light sensors and/or one or more image sensors associated with respective panes. For example, the first pane 104*a* may include a first sensor 122*a*, the second pane 104*b* may include a second sensor 122*b*, and the third pane 104*c* may include a third sensor 122*c*. In some aspects, the first sensor 122*a*, the second sensor 122*b*, and/or the third sensor 122*c* may include a light sensor. Each of the light sensors may record light data include a time, a movement, and/or a change in level of light received by the light sensor at the respective pane. The computing system 118 may receive the light data from each of the light sensors at the respective panes and correlate the light data amongst the panes to determine a relative position of each pane of the plurality of panes. For example, each of the light sensors may record light data including motion of the sun (e.g., to indicate a compass orientation), a movement and/or a shape of shadow casting on one or more of the panes, a change in light intensity received by one or more of the panes, and/or a relative amount of light intensity received between different panes. Based on the light data recorded by the light sensors and correlated between the light sensors of different panes, the computing system 114 may determine the relative positions of each of the panes relative to the plurality of panes.

Additionally, or alternatively, the first sensor 122*a*, the second sensor 122*b*, and/or the third sensor 122*c* may include an image sensor (e.g., a low resolution image sensor). Each of the image sensors may record image data include a time, a movement, and/or a change in level of light received by the image sensor at the respective pane. The computing system 118 may receive the image data from each of the image sensors at the respective panes and correlate the image data amongst the panes to determine a relative position of each pane of the plurality of panes. For example, each of the image sensors may record light data including a level of light intensity received by one or more of the panes, and/or a light distribution/glare amongst each of the different panes. Based on the image data recorded by the image sensors and correlated between the image sensors of different panes, the computing system 114 may determine the relative positions of each of the panes relative to the plurality of panes. It should be understood that the sensors (e.g., the first sensor 122, the second sensor 122*b*, and/or the third sensor 122*c*) may be positioned on an interior surface of a pane and/or an exterior surface of the pane. With respect to at least image sensors, an image sensor may include a fish-eye lens facing up from the bottom of the pane and/or facing down from the top of the pane to capture information from both the interior surface and the exterior surface of the pane.

In some aspects, the first indication provider device 108*a*, the second indication provider device 108*b*, and/or the third indication provider device 108*c* may include an audio transducer used to determine the relative positions of the respective panes. Sound waves (e.g., ultrasonic, auditory) may transmitted between panes and/or by the computing system node 114 for the computing system 118 to determine relative phase information to triangulate distances, or time of flight of the sound waves (e.g., time of transmission). Subsequently, the computing system 118 may determine the relative positions of the panes based on the triangulated distances and/or the time of flight of the sound waves.

Figure 5:
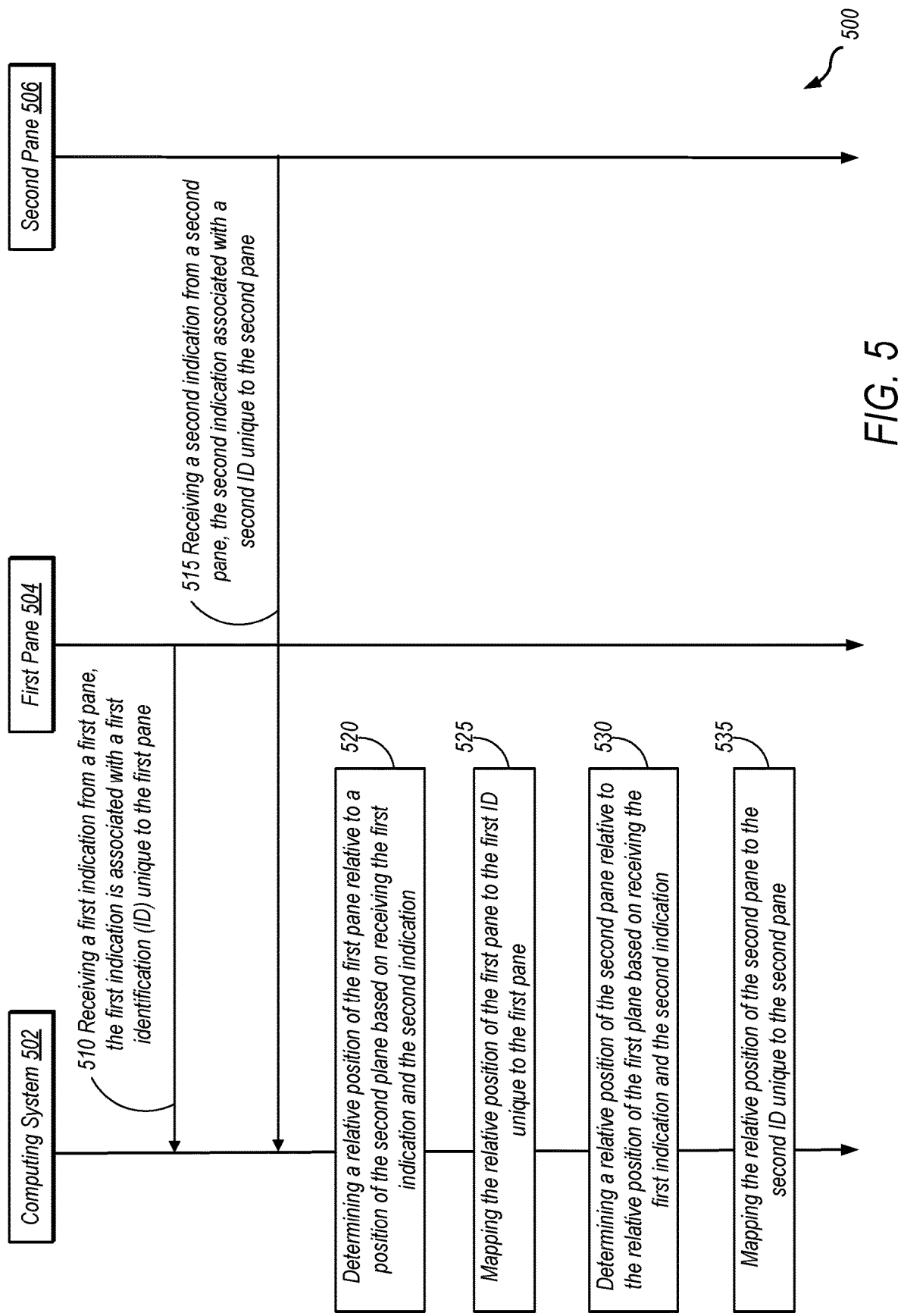
FIG. 5 illustrates an example system for mapping one or more panes according to some aspects.

FIG. 5 illustrates an example system 500 for mapping one or more panes according to some aspects. FIG. 5 may include one or more same or similar features as the system 100 of FIG. 1. As shown in FIG. 5, the system 500 includes a computing system 502, a first pane 504, and a second pane 506. At 510, the computing system 502 may receive a first indication from the first pane 504. The first indication may be associated with a first identification (ID) unique to the first pane 504. At 515, the computing system 502 may receive a second indication from the second pane 506. The second indication may be associated with a second ID unique to the second pane 506. At 520, the computing system 502 may determine a relative position of the first pane 504 relative to a position of the second pane 506 based on receiving the first indication and the second indication. At 525, the computing system 502 may map the relative position of the first pane 504 to the first ID unique to the first pane 504. At 530, the computing system 502 may determine a relative position of the second pane 506 relative to a position of the first pane 504 based on receiving the first indication and the second indication. At 535, the computing system 502 may map the relative position of the second pane 506 to the second ID unique to the second pane 506.

Figure 6:
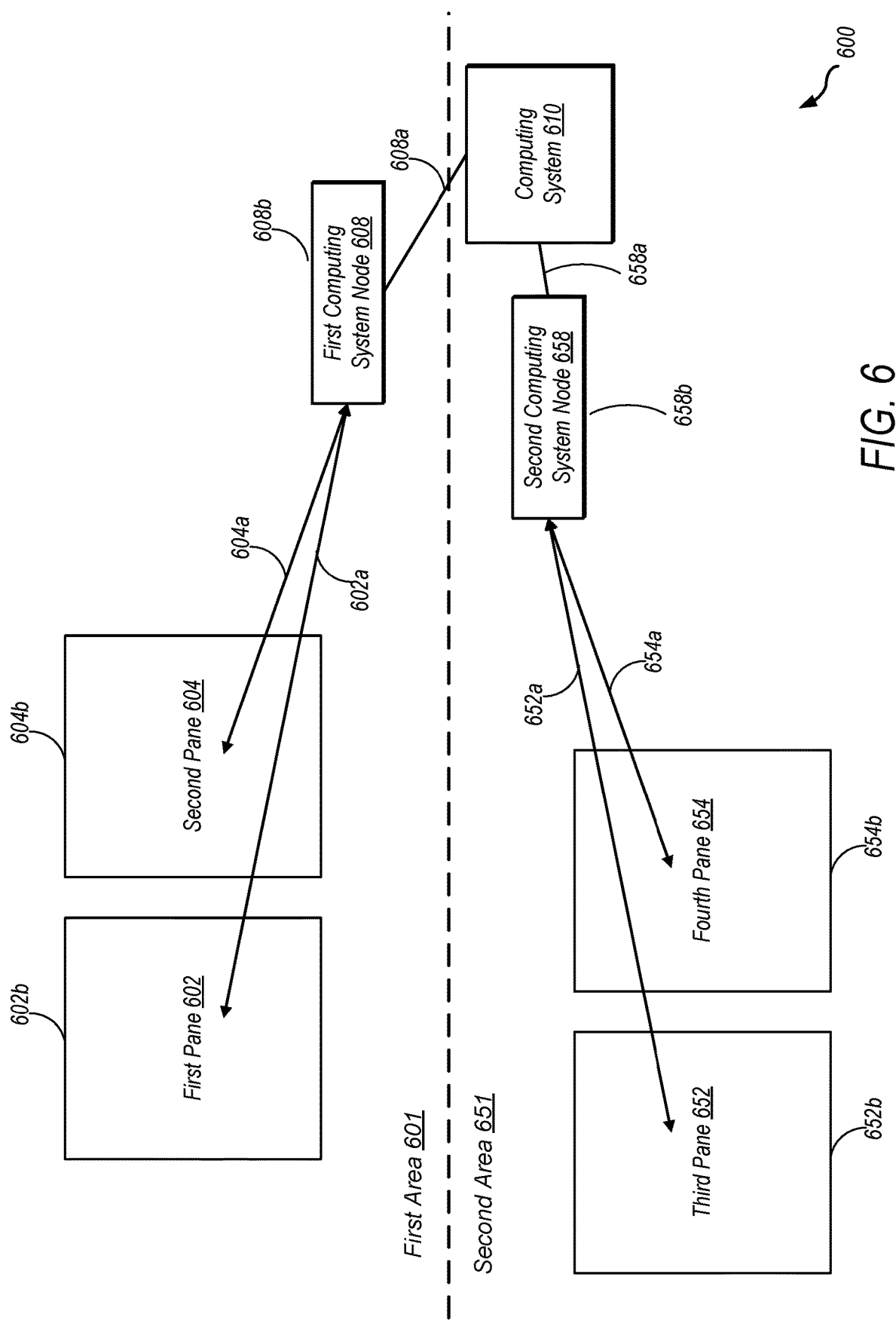
FIG. 6 illustrates an example system for mapping one or more panes according to some aspects.

FIG. 6 illustrates an example system 600 for mapping one or more panes according to some aspects. FIG. 6 may include one or more same or similar features as the system 100 of FIG. 1. As shown in FIG. 6, the system 600 may include a first area 601 having a first pane 602, a second pane 604, and a first computing system node 608. The first pane 602 may be in communication (e.g., electronic communication) with the first computing system node 608 via the first communication channel 604a and the second pane 604 may be in communication with the first computing system node 608 via the second communication channel 602a. The first computing system node 608 may be in communication (e.g., electronic communication) with the computing system 610 via the communication channel 608a. In addition, the system 600 may include a second area 651. The second area 651 may be on a different floor of a building than the first area 601, a different area of a building than the first area 601, in a different building than the first area 601, and/or the like. The second area 651 may have a third pane 652, a fourth pane 654, and a second computing system node 658. The third pane 652 may be in communication (e.g., electronic communication) with the second computing system node 658 via the third communication channel 652a and the fourth pane 654 may be in communication with the second computing system node 658 via the fourth communication channel 654a. The second computing system node 658 may be in communication (e.g., electronic communication) with the computing system 610 via the communication channel 658a. As described herein, the computing system 610 may determine the relative positions of the first pane 602, the second pane 604, the third pane 652, and the fourth pane 654. For example, as described herein, the computing system 610 may determine the relative positions of the first pane 602 and the second pane 604 based on communications between the first pane 602, the second pane 604, and/or the first computing system node 608. The computing system 610 may also determine the relative positions of the third pane 652 and the fourth pane 654 based on communications between the third pane 652, the fourth pane 654, and/or the second computing system node 658. The computing system 610 may also determine the position of the first computing system node 608 and the position of the second computing system node 658. For example, the computing system 610 may receive an indication that the first computing system node 608 is positioned in the first area 601 and an indication that the second computing system node 658 is positioned in the second area 651. Based on determining the relative positions of the first pane 602, the second pane 604, the third pane 652, and the fourth pane 654 and that the first computing system node 608 is positioned in the first area 601 and that the second computing system node 658 is positioned in the second area 651, the computing system 610 may determine the actual position of each of the first pane 602, the second pane 604, the third pane 652, and the fourth pane 654.

In some aspects, when the first area 601 is adjacent the second area 651, for example, the first computing system node 608 may determine a relative position of the third pane 652 relative to a position of the first pane 602 and/or the second pane 604. At the same time, the second computing system node 658 may determine the relative position of the third pane 652 relative to the position of the fourth pane 654. The computing system 610, having the location or position of both the first computing system node 608 and the second computing system node 658, may triangulate the position of the third pane 652 (e.g., the actual position of the third pane 652) based on the first computing system node 608 determining the relative position of the third pane 652 and the second computing system node 658 determining the relative position of the third pane 652.

Figure 7:
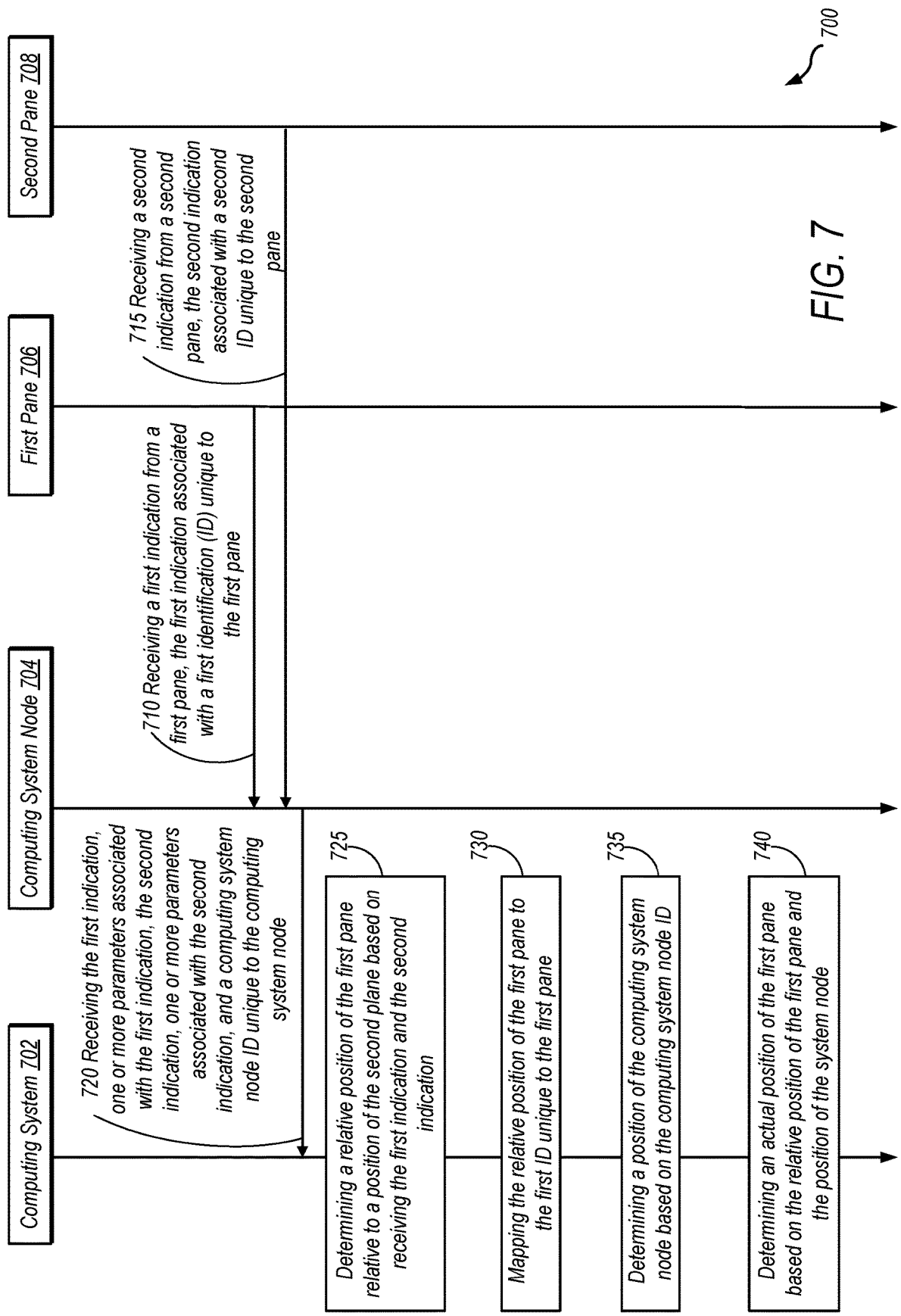
FIG. 7 illustrates an example system for mapping one or more panes according to some aspects.

FIG. 7 illustrates an example system 700 for mapping one or more panes according to some aspects. FIG. 7 may include one or more same or similar features as the system 100 of FIG. 1. As shown in FIG. 7, the system 700 includes a computing system 702, a computing system node 704, a first pane 706, and a second pane 708. The system 700 of FIG. 7 may be correlated with the system 600 of FIG. 6.

At 710, the computing system node 704 may receive a first indication from the first pane 706. The first indication may be associated with a first identification (ID) unique to the first pane 706. At 715, the computing system node 704 may receive a second indication from the second pane 708. The second indication may be associated with a second ID unique to the second pane 708. At 720, the computing system 702 may receive the first indication, one or more parameters associated with the first indication, the second indication, one or more parameters associated with the second indication, and a system node ID unique to the system node. In some aspects, the system node ID may be used by the computing system 702 to identify the computing system node 704 and the associated position or location of the computing system node 704. At 725, the computing system 702 may determine a relative position of the first pane 706 relative to a position of the second pane 702 based on receiving the first indication, the one or more parameters of the first indication, the second indication, and the one or more parameters associated with the second indication. At 730, the computing system 702 may map the relative position of the first pane 706 to the first ID unique to the first pane 706. At 735, the computing system 702 may determine a position of the computing system node 704 based on the system node ID. For example, the computing system 702 may use the computing system node ID to identify the computing system node 704 and the associated position or location of the computing system node 704 using a lookup table. At 740, the computing system 502 may determine an actual position of the first pane 706 based on the relative position of the first pane 706 and the position of the computing system node 704.

Figure 8:
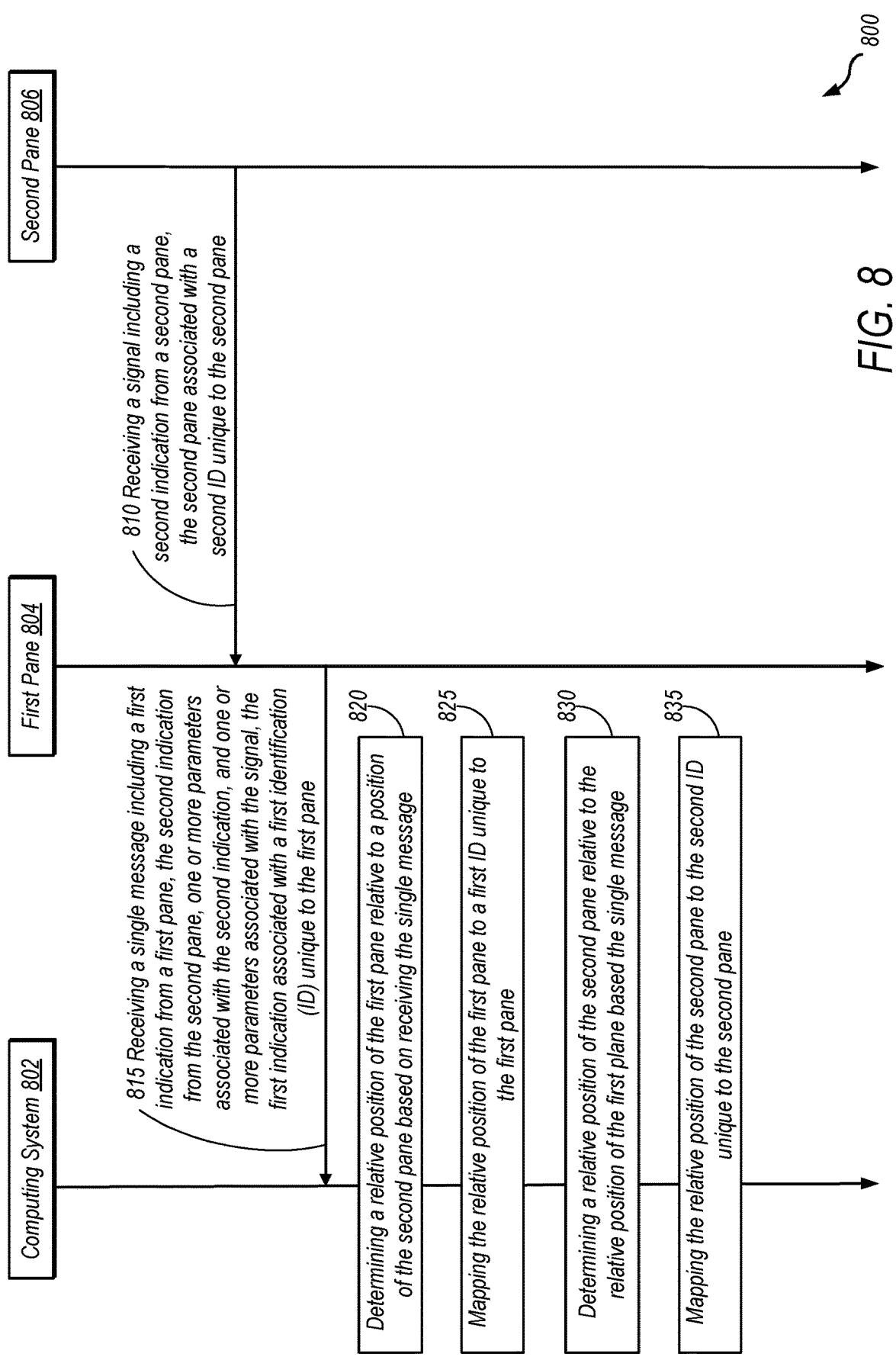
FIG. 8 illustrates an example system for mapping one or more panes according to some aspects.

FIG. 8 illustrates an example system 800 for mapping one or more panes according to some aspects. FIG. 8 may include one or more same or similar features as the system 100 of FIG. 1. As shown in FIG. 8, the system 800 includes a computing system 802, a first pane 804, and a second pane 806. At 810, the computing system 802 may receive a signal including a second indication from a second pane 806. The second indication may be associated with a second identification (ID) unique to the second pane 806. At 815, the computing system 802 may receive a single message including a first indication from the first pane 804, the second indication from the second pane 806, one or more parameters associated with the second indication, and one or more parameters associated with the signal. The first indication may be associated with a first ID unique to the first pane 804. At 820, the computing system 802 may determine a relative position of the first pane 804 relative to a position of the second pane 806 based on receiving the single message. At 825, the computing system 802 may map the relative position of the first pane 804 to the first ID unique to the first pane 804. At 830, the computing system 802 may determine a relative position of the second pane 806 relative to a position of the first pane 804 based on receiving the single message. At 835, the computing system 802 may map the relative position of the second pane 806 to the second ID unique to the second pane 806.

Figure 9:
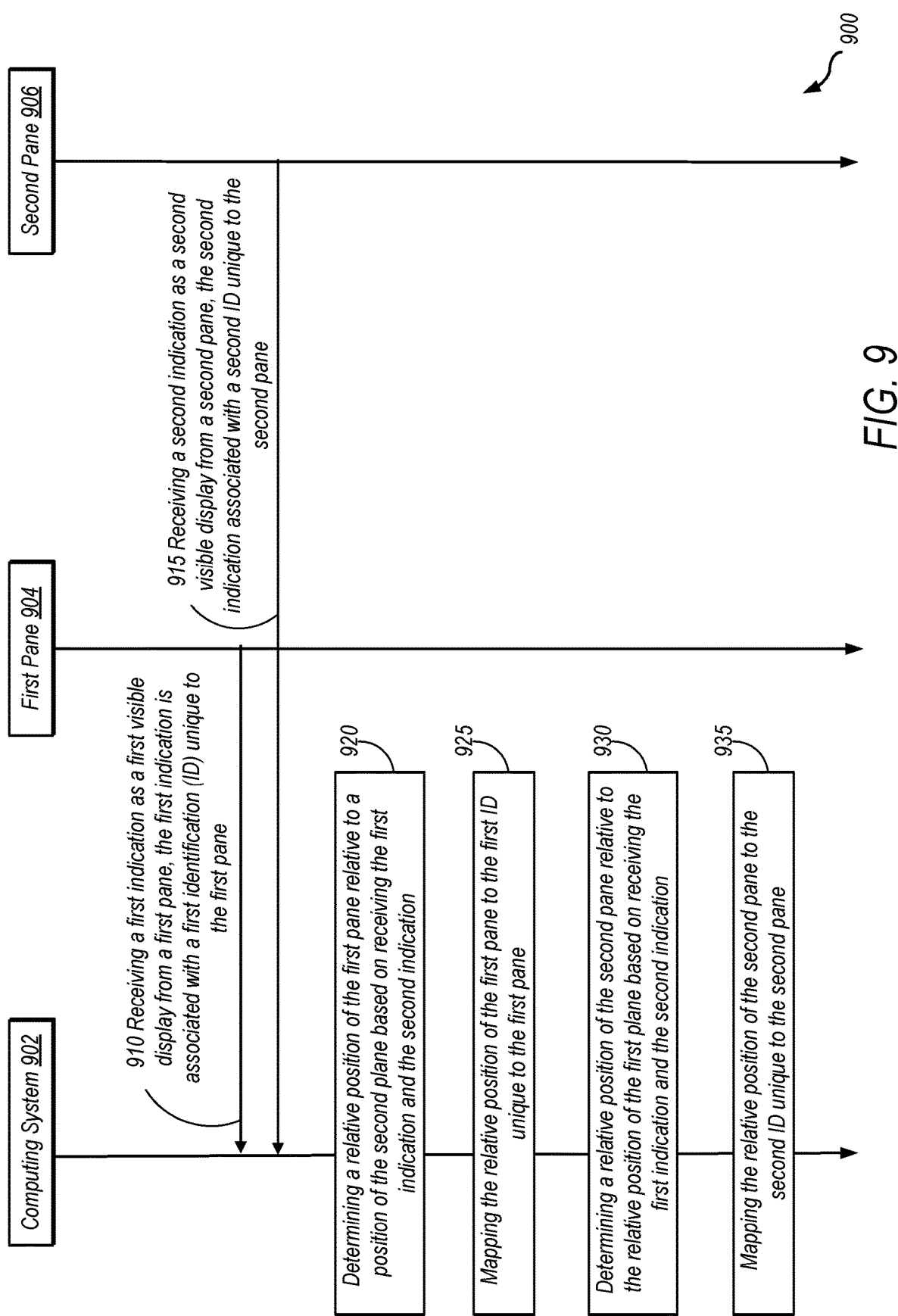
FIG. 9 illustrates an example system for mapping one or more panes according to some aspects.

FIG. 9 illustrates an example system 900 for mapping one or more panes according to some aspects. FIG. 9 may include one or more same or similar features as the system 100 of FIG. 1. As shown in FIG. 9, the system 900 includes a computing system 902, a first pane 904, and a second pane 906. At 910, the computing system 902 may receive a first indication as a first visible display from the first pane 904. The first indication may be associated with a first identification (ID) unique to the first pane 904. At 915, the computing system 902 may receive a second identification as a second visible display from the second pane 906. The second indication may be associated with a second ID unique to the second pane 906. At 920, the computing system 902 may determine a relative position of the first pane 904 relative to a position of the second pane 906 based on receiving the first indication and the second indication. At 925, the computing system 902 may map the relative position of the first pane 904 to the first ID unique to the first pane 904. At 930, the computing system 902 may determine a relative position of the second pane 906 relative to a position of the first pane 904 based on receiving the first indication and the second indication. At 935, the computing system 902 may map the relative position of the second pane 906 to the second ID unique to the second pane 906.

Figure 10:
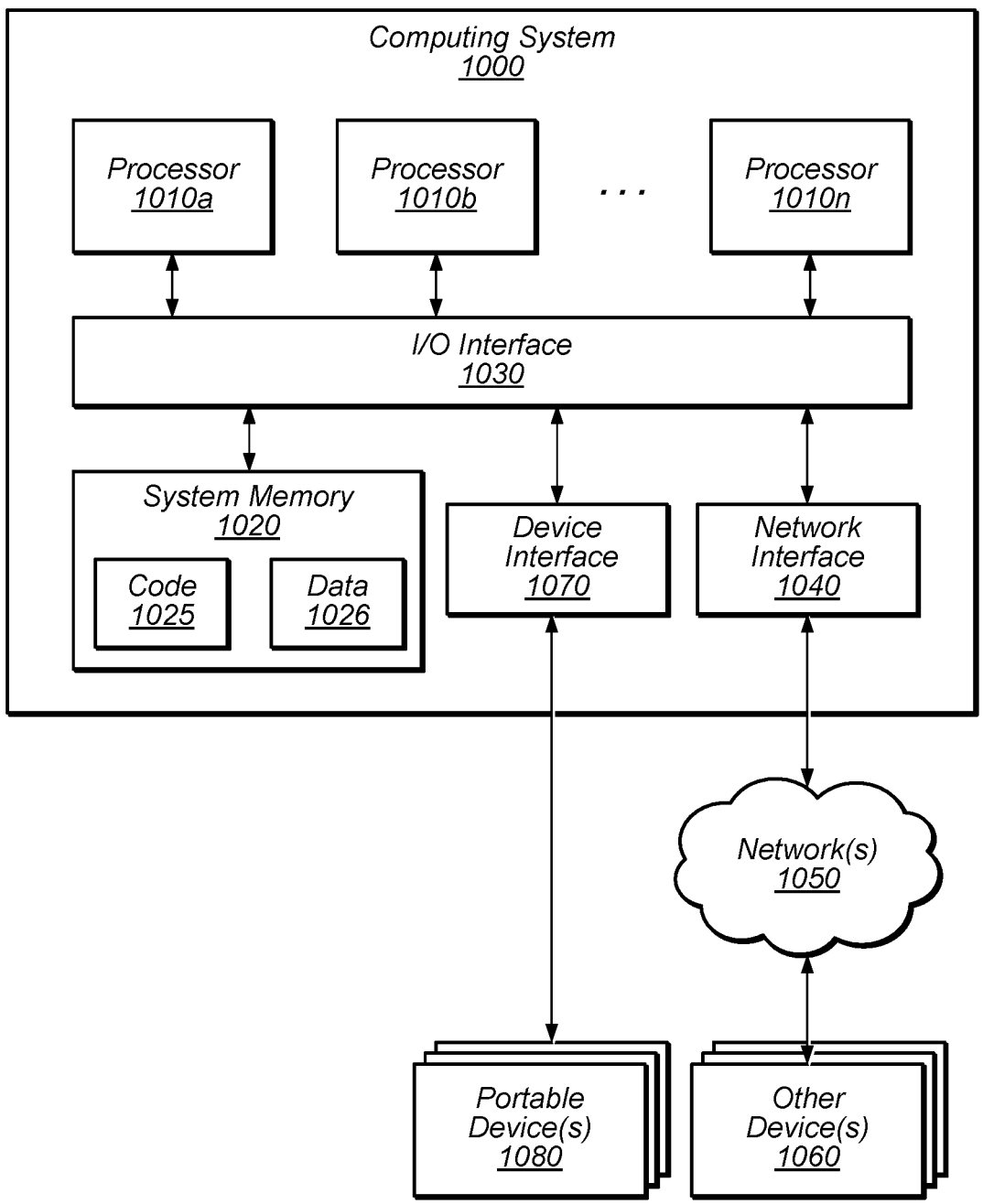
FIG. 10 illustrates an example computing system that may be used in some embodiments.

FIG. 10 illustrates an example computing system 1000 that may be used in some embodiments. The computing system 1000 may be the same as or at least similar to one or more computing systems describes in FIGS. 1 and 5-9. The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various computing systems, devices, or servers and other components that implement the system at the provider site and/or the customer site and the associated project databases as described herein). The various methods as illustrated in the figures and described herein represent example embodiments of methods. The order of any method may be changed, and various elements may be added, reordered, combined, omitted, modified, etc.

FIG. 10 is a block diagram illustrating a computing system 1000 according to various embodiments, as well as various other systems, components, services or devices described herein. Computing system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computing system 1000 includes one or more processors 1010 (any of which may include multiple cores, which may be single or multi-threaded) coupled to a system memory 1020 via an input/output (I/O) interface 1030. Computing system 1000 further includes a network interface 1040 coupled to I/O interface 1030. In various embodiments, computing system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computing system 1000 also includes one or more network communication devices (e.g., network interface 1040) for communicating with other systems and/or components over a communications network (e.g., Internet, LAN, wireless network etc.).

In the illustrated embodiment, computing system 1000 is coupled to one or more portable storage devices 1080 via device interface 1070. In various embodiments, portable storage devices 1080 may correspond to disk drives, tape drives, solid state memory, other storage devices, or any other persistent storage device. Computing system 1000 (or a distributed application or operating system operating thereon) may store instructions and/or data in portable storage devices 1080, as desired, and may retrieve the stored instruction and/or data as needed.

Computing system 1000 includes one or more system memories 1020 that can store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM (e.g., Flash), non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a system, local controller, project database, etc., in different embodiments. In some embodiments, program instructions 1025 may implement multiple systems, project databases, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing system 1000 via I/O interface 1030. A non-transitory computer-readable storage medium may also include any volatile or non-volatile media such as RAM (e.g., SDRAM, DDR SDRAM, RDRAM, SRAM, etc.), ROM, etc., that may be included in some embodiments of computing system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1026, which may be implemented as described herein. For example, the information described herein as being stored by the project database may be stored in data store 1026, or in another portion of system memory 1020 on one or more nodes, in other devices 1060.

In one embodiment, I/O interface 1030 may coordinate I/O traffic between processor 1010, system memory 1020 and any peripheral devices in the system, including through network interface 1040 or other peripheral interfaces, such as device interface 1070. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computing system 1000 and other devices attached to a network, such as other computer systems 1060. In addition, network interface 1040 may allow communication between computing system 1000 and various I/O devices and/or remote storage devices. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computing system 1000 or may be distributed on various nodes of a distributed system that includes computing system 1000. In some embodiments, similar input/output devices may be separate from computing system 1000 and may interact with one or more nodes of a distributed system that includes computing system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computing system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

Figure 11:
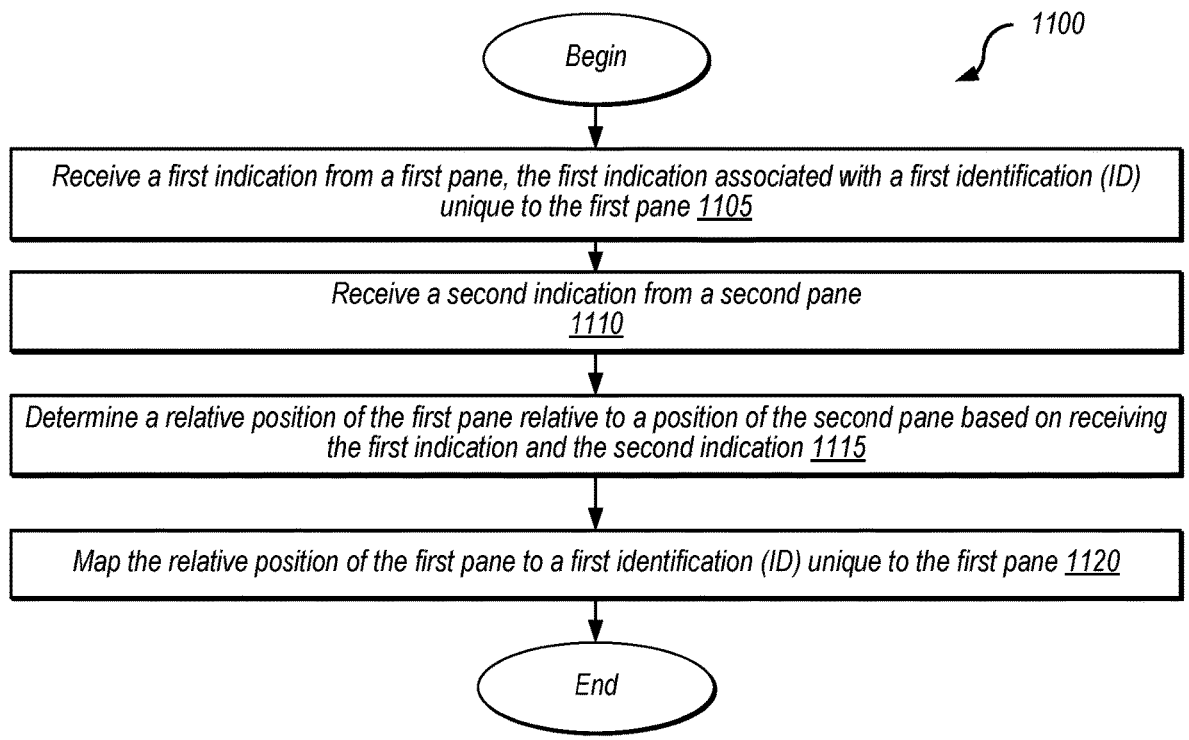
FIG. 11 shows a flowchart illustrating a process implemented by computing system for mapping one or more panes according to some aspects.

FIG. 11 shows a flowchart illustrating a process 1100 implemented by computing system for mapping one or more panes according to some aspects. The computing system may be the computing system 1000 illustrated in FIG. 10. At block 1105, the computing system 1000 may receive a first indication from a first pane. The first indication may be associated with a first identification (ID) unique to the first pane. At block 1110, the computing system 1000 may receive a second indication from a second pane. At block 1115, the computing system 1000 may determine a relative position of the first pane relative to a position of the second pane based on receiving the first indication and the second indication. At block 1120, the computing system 1000 may map the relative position of the first pane to a first identification (ID) unique to the first pane.

Figure 12:
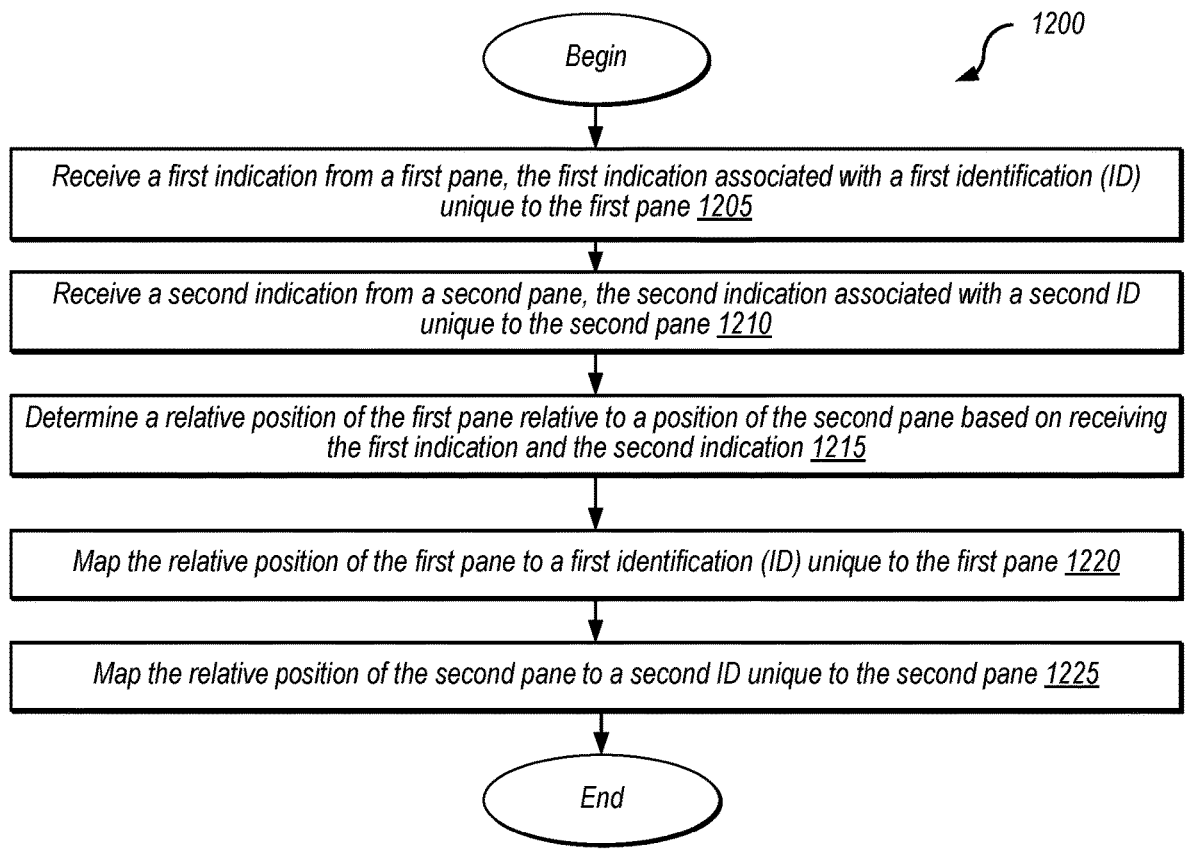
FIG. 12 shows a flowchart illustrating a process implemented by computing system for mapping one or more panes according to some aspects.

FIG. 12 shows a flowchart illustrating a process 1200 implemented by computing system for mapping one or more panes according to some aspects. The computing system may be the computing system 1000 illustrated in FIG. 10. At block 1205, the computing system 1000 may receive a first indication from a first pane. The first indication may be associated with a first identification (ID) unique to the first pane. At block 1210, the computing system 1000 may receive a second indication from a second pane. The second indication may be associated with a second ID unique to the second pane. At block 1215, the computing system 1000 may determine a relative position of the first pane relative to a position of the second pane and, consequently, a relative position of the second pane relative to a position of the first pane based on receiving the first indication and the second indication. At block 1220, the computing system 1000 may map the relative position of the first pane to the first ID unique to the first pane. At block 1225, the computing system 1000 may map the relative position of the second pane to the second ID unique to the second pane.

Figure 13:
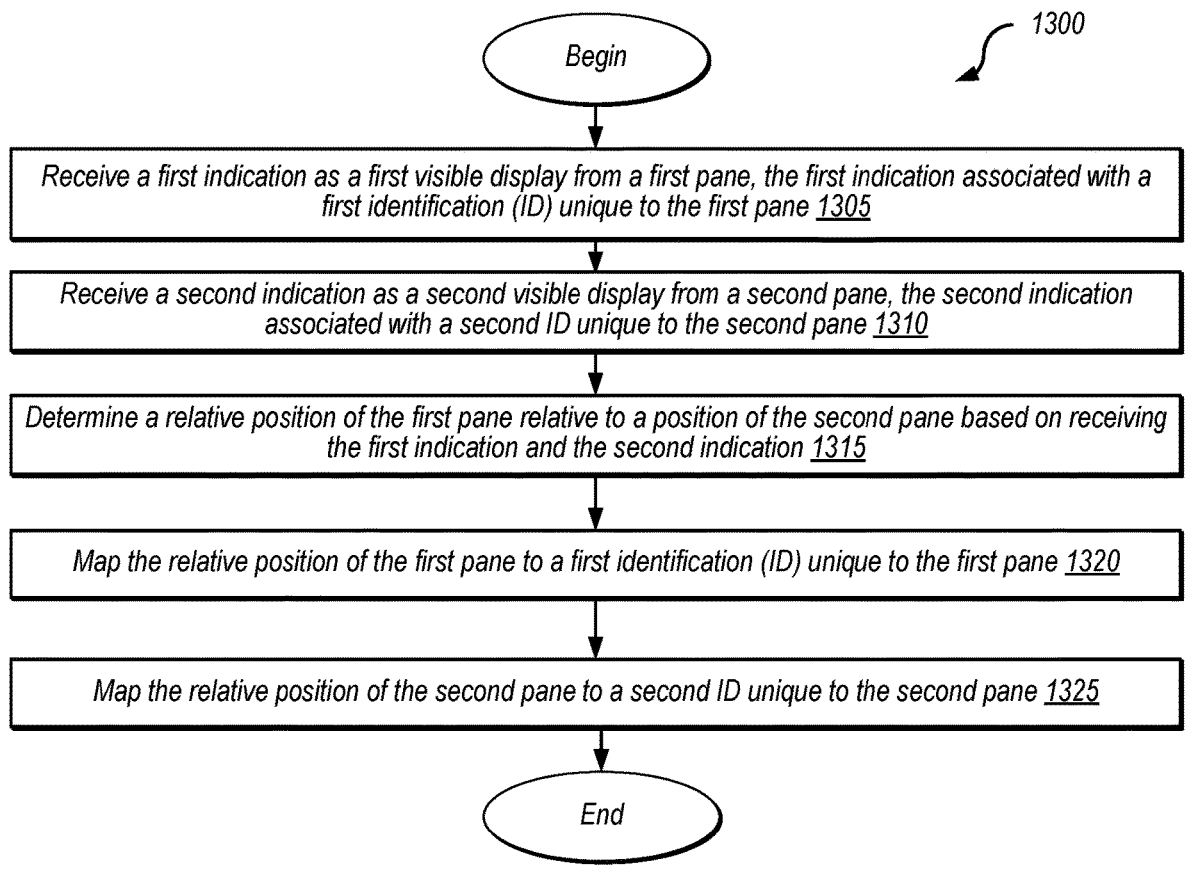
FIG. 13 shows a flowchart illustrating a process implemented by computing system for mapping one or more panes according to some aspects.

FIG. 13 shows a flowchart illustrating a process 1300 implemented by computing system for mapping one or more panes according to some aspects. The computing system may be the computing system 1000 illustrated in FIG. 10. At block 1305, the computing system 1000 may receive a first indication as a first visual display from a first pane. The first indication may be associated with a first identification (ID) unique to the first pane. At block 1310, the computing system 1000 may receive a second indication as a second visual display from a second pane. The second indication may be associated with a second ID unique to the second pane. At block 1315, the computing system 1000 may determine a relative position of the first pane relative to a position of the second pane and, consequently, a relative position of the second pane relative to a position of the first pane based on receiving the first indication and the second indication. At block 1320, the computing system 1000 may map the relative position of the first pane to the first ID unique to the first pane. At block 1325, the computing system 1000 may map the relative position of the second pane to the second ID unique to the second pane.

In some aspects, a system for mapping a plurality of panes on a structure is provided. The system may include the plurality of panes located at different respective positions on the structure. The system may also include a transceiver. The system may further include at least one processor. The at least one processor may be configured to receive a single message from a first pane of the plurality of panes. The single message may include a first indication from the first pane and a second indication based on a signal received by the first pane and from a second pane of the plurality of panes. The first indication may be associated with a first identification (ID) unique to the first pane and the second indication is associated with a second ID unique to the second pane. The at least one processor may also be configured to determine a relative position of the first pane relative to a position of the second pane based on at least one of a received signal strength or a received signal direction of the signal received by the first pane and from the second pane, at least one of a received signal strength or a received signal direction of the signal received by first pane and from the third pane, and at least one of a received signal strength or a received signal direction of the single message received from the first pane. The at least one processor may further be configured to map the relative position of the first pane to the first ID, the relative position of the second pane to the second ID, and the relative position of the third pane to the third ID.

In some aspects, a system for mapping one or more panes on a structure is provided. The system may include a plurality of panes located at different respective positions on the structure. The system may also include a camera. The system may further include at least one processor. The at least one processor may be configured to receive, via the camera, a first image of a first pane of the plurality of panes providing a first visible display. The first visible display may be associated with a first identification (ID) unique to the first pane. The at least one processor may also be configured to receive, via the camera, a second image of a second pane of the plurality of panes providing a second visible display. The at least one processor may further be configured to determine a relative position of the first pane relative to a position of the second pane based on the first visible display and the second visible display. In addition, the at least one processor may be configured to map the relative position of the first pane to the first ID.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Figure 14:
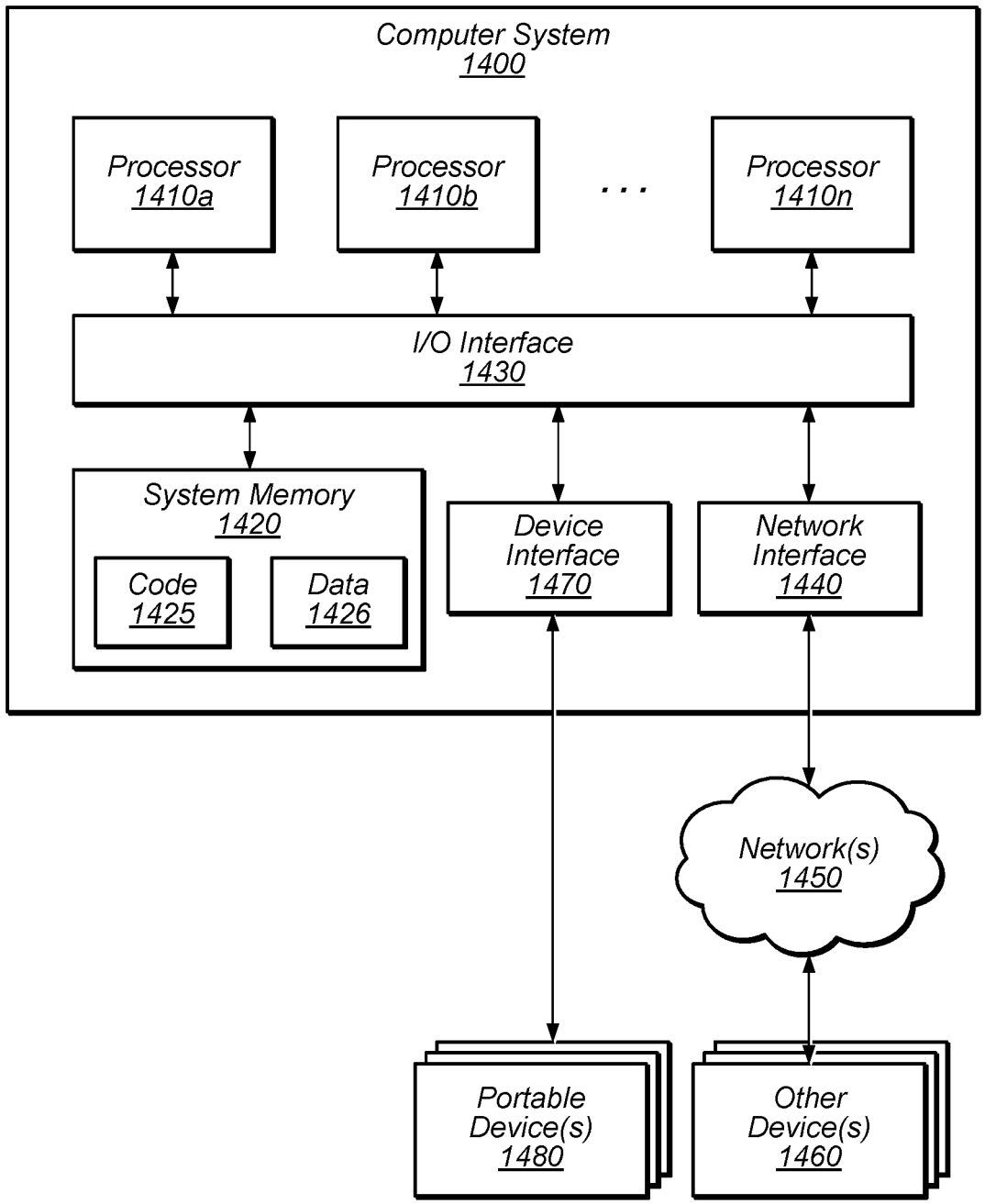
FIG. 14 illustrates an example computer system according to some aspects.

FIG. 14 illustrates an example computer system 1400 that may be used in some embodiments. The computer system 1400 may be the same as or at least similar to one or more computing systems described with respect to at least one of FIGS. 1A and 5-9, one or more of the indication provider devices described with respect to at least FIG. 1A one or more sensors described with respect to at least FIG. 1A one or more computing system nodes described with respect to at least FIGS. 1A and 6, and/or any other components or elements described herein. The methods described herein may in various embodiments be implemented by any combination of hardware and software. For example, in one embodiment, the methods may be implemented by a computer system (e.g., a computer system as in FIG. 14) that includes one or more processors executing program instructions stored on a computer-readable storage medium coupled to the processors. The program instructions may implement the functionality described herein (e.g., the functionality of various computing devices or servers and other components that implement the system at the provider site and/or the customer site and the associated project databases as described herein). The various methods as illustrated in the figures and described herein represent example embodiments of methods. The order of any method may be changed, and various elements may be added, reordered, combined, omitted, modified, etc.

FIG. 14 is a block diagram illustrating a computer system according to various embodiments, as well as various other systems, components, services or devices described above. Computer system 1400 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1400 includes one or more processors 1410 (any of which may include multiple cores, which may be single or multi-threaded) coupled to a system memory 1420 via an input/output (I/O) interface 1430. Computer system 1400 further includes a network interface 1440 coupled to I/O interface 1430. In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, PowerPC, SPARC, or MIPS ISAs, or any other suitable ISA. In multiprocessor systems, each of processors 1410 may commonly, but not necessarily, implement the same ISA. The computer system 1400 also includes one or more network communication devices (e.g., network interface 1440) for communicating with other systems and/or components over a communications network (e.g. Internet, LAN, etc.).

In the illustrated embodiment, computer system 1400 is coupled to one or more portable storage devices 1480 via device interface 1470. In various embodiments, portable storage devices 1480 may correspond to disk drives, tape drives, solid state memory, other storage devices, or any other persistent storage device. Computer system 1400 (or a distributed application or operating system operating thereon) may store instructions and/or data in portable storage devices 1480, as desired, and may retrieve the stored instruction and/or data as needed.

Computer system 1400 includes one or more system memories 1420 that can store instructions and data accessible by processor(s) 1410. In various embodiments, system memories 1420 may be implemented using any suitable memory technology, (e.g., one or more of cache, static random access memory (SRAM), DRAM, RDRAM, EDO RAM, DDR 14 RAM, synchronous dynamic RAM (SDRAM), Rambus RAM, EEPROM, non-volatile/Flash-type memory, or any other type of memory). System memory 1420 may contain program instructions 1425 that are executable by processor(s) 1410 to implement the methods and techniques described herein. In various embodiments, program instructions 1425 may be encoded in platform native binary, any interpreted language such as Java™ byte-code, or in any other language such as C/C++, Java™, etc., or in any combination thereof. For example, in the illustrated embodiment, program instructions 1425 include program instructions executable to implement the functionality of a system, local controller, project database, etc., in different embodiments. In some embodiments, program instructions 1425 may implement multiple systems, project databases, and/or other components.

In some embodiments, program instructions 1425 may include instructions executable to implement an operating system (not shown), which may be any of various operating systems, such as UNIX, LINUX, Solaris™, MacOS™, Windows™, etc. Any or all of program instructions 1425 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1400 via I/O interface 1430. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1400 as system memory 1420 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1440.

In some embodiments, system memory 1420 may include data store 1426, which may be implemented as described herein. For example, the information described herein as being stored by the project database may be stored in data store 1426, or in another portion of system memory 1420 on one or more nodes, in other devices 1460.

In one embodiment, I/O interface 1430 may coordinate I/O traffic between processor 1410, system memory 1420 and any peripheral devices in the system, including through network interface 1440 or other peripheral interfaces, such as device interface 1470. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments, some or all of the functionality of I/O interface 1430, such as an interface to system memory 1420, may be incorporated directly into processor 1410.

Network interface 1440 may allow data to be exchanged between computer system 1400 and other devices attached to a network, such as other computer systems 1460. In addition, network interface 1440 may allow communication between computer system 1400 and various I/O devices and/or remote storage devices. Input/output devices may, in some embodiments, include one or more display terminals, keyboards, keypads, touchpads, scanning devices, voice or optical recognition devices, or any other devices suitable for entering or retrieving data by one or more computer systems 1400. Multiple input/output devices may be present in computer system 1400 or may be distributed on various nodes of a distributed system that includes computer system 1400. In some embodiments, similar input/output devices may be separate from computer system 1400 and may interact with one or more nodes of a distributed system that includes computer system 1400 through a wired or wireless connection, such as over network interface 1440. Network interface 1440 may commonly support one or more wireless networking protocols (e.g., Wi-Fi/IEEE 802.11, or another wireless networking standard). However, in various embodiments, network interface 1440 may support communication via any suitable wired or wireless general data networks, such as other types of Ethernet networks, for example. Additionally, network interface 1440 may support communication via telecommunications/telephony networks such as analog voice networks or digital fiber communications networks, via storage area networks such as Fibre Channel SANs, or via any other suitable type of network and/or protocol. In various embodiments, computer system 1400 may include more, fewer, or different components than those illustrated in FIG. 14 (e.g., displays, video cards, audio cards, peripheral devices, other network interfaces such as an ATM interface, an Ethernet interface, a Frame Relay interface, etc.)

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A method for mapping one or more panes on a structure, the method comprising:
    receiving a message from a first pane, wherein the message includes a first indication for the first pane and a second indication for a second pane, wherein the first indication is associated with a first identification (ID) unique to the first pane, wherein the second indication includes information for determining a spatial relationship between the first pane and the second pane and is associated with a second ID unique to the second pane;

determining a position of the first pane and the second pane based on the first indication and the information of the second indication; and mapping the position of the first pane to the first ID and the position of the second pane to the second ID.

2. The method of claim 1, wherein the message is received by a transceiver based on a wireless power transfer technique.

3. The method of claim 1, wherein the message further comprises: a third indication for a third pane, wherein the third indication includes information for determining a spatial relationship between the first pane and the third pane and is associated with a third ID unique to the third pane, wherein determining the position of the first pane and the second pane comprises determining the position of the first pane, the second pane, the third pane based on receiving the first indication, the second indication, and the third indication of the single message, and wherein mapping the position of the first pane to the first ID and the position of the second pane to the second ID comprises mapping the position of the first pane to the first ID, the position of the second pane to the second ID, and the position of the third pane to the third ID.

4. The method of claim 3, wherein:
the position of the first pane, the second pane, and the third pane is based on:
  at least one of a received signal strength or a received signal direction of a signal of the second indication received from the second pane and received by the first pane;
  at least one of a received signal strength or a received signal direction of a signal of the third indication received from the third pane and received by the first pane; and
  at least one of a received signal strength or a received signal direction of the message received from the first pane.

5. The method of claim 1, wherein a transceiver of the first pane receives a signal from a transceiver of the second pane for the first pane to determine the second indication.

6. The method of claim 5, wherein the position of the first pane is based on a received signal strength and a received signal direction of the message, and the position of the second pane is based on the position of the first pane and a received signal strength and a received signal direction of the second signal received by the transceiver of the first pane.

7. The method of claim 5, wherein determining the position of the first pane is based on a received direction and a received signal strength of the message, and wherein determining the position of the second pane is based on a relative position of the second pane, determined by the first pane, according to a received signal strength and a received signal direction of the signal received by the transceiver of the first pane from the transceiver of the second pane.

8. The method of claim 5, further comprising:
determining an actual position of the first pane and the second pane based on a position of a node receiving the message and the positions of the first pane and the second pane.

9. The method of claim 1, wherein determining the positions of the first pane and the second pane is based on a first set of global position system (GPS) coordinates indicating a position of the first pane and a second set of GPS coordinates indicating a position of the second pane.

10. The method of claim 1, wherein receiving the message comprises recording an image of a visible display from the first pane.

11. The method of claim 10, wherein the visible display comprises at least one of a visible light signal from a light emitting diode of the first pane, one or more displayed symbols from the first pane, or a change in pane opacity of the first pane.

12. The method of claim 10, wherein receiving the visible display comprises receiving at least one of a sequence of light flashes of one or more of varying time intervals or varying brightness from a light emitting diode of the first pane, a sequence of displayed symbols from the first pane, or a change in opacity of the first pane to a particular amount of opacity or a during a predetermined amount of time to a particular amount of opacity.

13. The method of claim 1, wherein the first indication comprises an indication that a first light sensor associated with the first pane has received a first change in visible light, and wherein the second indication comprises an indication that a second light sensor associated with the second pane has received a second change in visible light.

14. The method of claim 13, the position of the first pane and the position of the second pane is determined based on at least one of a timing, an intensity, or a quantity of the first change in visible light relative to the second change in visible light.

15. The method of claim 13, wherein at least one of the first change in visible light or the second change in visible light is based on at least one of:
  a position of a casted shadow on at least one of the first light sensor or the second light sensor,
  a motion of a casted shadow on at least one of the first light sensor or the second light sensor,
  a position of an exterior light source communicating visible light to at least one of the first light sensor or the second light sensor,
  a motion of an exterior light source communicating visible light to at least one of the first light sensor or the second light sensor,
  a position of an interior light source communicating visible light to at least one of the first light sensor or the second light sensor,
  a motion of an interior light source communicating visible light to at least one of the first light sensor or the second light sensor,
  a position of an exterior object reflecting visible light to at least one of the first light sensor or the second light sensor,
  a motion of an exterior object reflecting visible light to at least one of the first light sensor or the second light sensor,
  a position of an interior object reflecting visible light to at least one of the first light sensor or the second light sensor, or
  a motion of an interior object reflecting visible light to at least one of the first light sensor or the second light sensor.

16. A system for mapping a plurality of panes on a structure, the system comprising:
the plurality of panes located at different respective positions on the structure;
a transceiver; and
at least one processor configured to:
  receive a message including a first signal from a first pane of the plurality of panes and a second signal from a second pane of the plurality of panes, wherein the first signal is associated with a first identification (ID) unique to the first pane, and wherein the second signal includes information for determining a spatial relationship between the first pane and the second pane and is associated with a second ID unique to the second pane, determine a position of the first pane and a position of the second pane based on the received first signal from the first pane and the received second signal including the information from the second pane, and map the position of the first pane to the first ID and the position of the second pane to the second ID.

17. The system of claim 16, wherein the message is received by the at least one processor based on a wireless power transfer technique.

18. The system of claim 16, wherein the message further comprises:

a third signal from a third pane, wherein:
the third signal is associated with a third ID unique to the third pane,
determining the position of the first pane and the second pane comprises determining the position of the first pane, the second pane, the third pane based on receiving the first signal, the second signal, and the third signal, and mapping the position of the first pane to the first ID and the position of the second pane to the second ID comprises mapping the position of the first pane to the first ID, the position of the second pane to the second ID, and the position of the third pane to the third ID.

19. The system of claim 16, wherein a transceiver of the first pane receives a signal from a transceiver of the second pane for the first pane to determine the second indication.

20. The method of claim 19, wherein the at least one processor is further configured to:

determine an actual position of the first pane and the second pane based on a position of the at least one processor and the positions of the first pane and the second pane.

\* \* \* \* \*